US011116140B2

(12) United States Patent
Adams et al.

(10) Patent No.: US 11,116,140 B2
(45) Date of Patent: Sep. 14, 2021

(54) BALING PRESS FOR COTTON GIN TRASH AND OTHER BIOMASS FEEDSTOCK AND METHODS OF USING THE SAME

(71) Applicant: C & M Baling Systems, Inc., Winston-Salem, NC (US)

(72) Inventors: Raymond Clyde Adams, Myrtle Beach, SC (US); Wesley Allen Morgan, New London, NC (US)

(73) Assignee: C & M Baling Systems, Inc., Winston-Salem, NC (US)

( * ) Notice: Subject to any disclaimer, the term of this patent is extended or adjusted under 35 U.S.C. 154(b) by 0 days.

(21) Appl. No.: 16/385,540

(22) Filed: Apr. 16, 2019

(65) Prior Publication Data
US 2019/0239443 A1 Aug. 8, 2019

Related U.S. Application Data

(62) Division of application No. 14/672,179, filed on Mar. 29, 2015, now Pat. No. 10,306,839.

(60) Provisional application No. 61/972,250, filed on Mar. 29, 2014.

(51) Int. Cl.
| | |
|---|---|
| *A01F 15/14* | (2006.01) |
| *A01F 15/04* | (2006.01) |
| *A01F 15/08* | (2006.01) |
| *B30B 9/30* | (2006.01) |
| *B65B 63/02* | (2006.01) |
| *B65B 27/12* | (2006.01) |
| *D01B 1/04* | (2006.01) |
| *B65B 13/06* | (2006.01) |

(52) U.S. Cl.
CPC .............. *A01F 15/14* (2013.01); *A01F 15/04* (2013.01); *A01F 15/0825* (2013.01); *B30B 9/3025* (2013.01); *B65B 27/12* (2013.01); *B65B 63/028* (2013.01); *D01B 1/04* (2013.01); *B65B 13/06* (2013.01)

(58) Field of Classification Search
CPC ...... A01F 15/14; A01F 15/04; A01F 15/0825; B30B 13/06; B30B 27/12; B30B 63/028; B30B 9/3025; D01B 1/04; B65B 13/06; B65B 27/12; B65B 63/028
USPC ..................... 100/179, 188 R, 191, 192, 242
See application file for complete search history.

(56) References Cited

U.S. PATENT DOCUMENTS

| | | | | |
|---|---|---|---|---|
| 1,631,881 A | * | 6/1927 | Murray | A01F 15/0825 100/191 |
| 2,823,603 A | * | 2/1958 | Collins | A01F 15/0825 100/179 |
| 3,024,719 A | * | 3/1962 | Englund | B30B 9/3089 100/44 |
| 3,212,434 A | * | 10/1965 | Raab | B30B 9/3025 100/192 |

(Continued)

FOREIGN PATENT DOCUMENTS

FR          1452789 A  *  4/1966  ......... A01F 15/0825

*Primary Examiner* — Jimmy T Nguyen
(74) *Attorney, Agent, or Firm* — FisherBroyles, LLP

(57) ABSTRACT

A baling press for baling cotton gin trash and other particulate biomass feedstock. The baling press generally includes an infeed chute assembly, a compression ram assembly, an extrusion chamber assembly, a strapping storage and dispensing assembly, and a strapping insertion assembly. The present invention also relates to methods of producing a bale with the baling press and a bale generated by the baling press and described methods.

10 Claims, 14 Drawing Sheets

(56) References Cited

U.S. PATENT DOCUMENTS

| | | | | | |
|---|---|---|---|---|---|
| 3,350,999 | A | * | 11/1967 | Morse | B30B 9/3025 100/43 |
| 4,354,430 | A | * | 10/1982 | Horiuchi | A01F 15/0825 100/192 |
| 4,489,648 | A | * | 12/1984 | Naaktgeboren | B30B 9/3025 100/191 |
| 4,565,123 | A | * | 1/1986 | Sanders | B30B 9/3089 100/192 |
| 5,735,199 | A | * | 4/1998 | Esau | A01F 15/0825 100/191 |

* cited by examiner

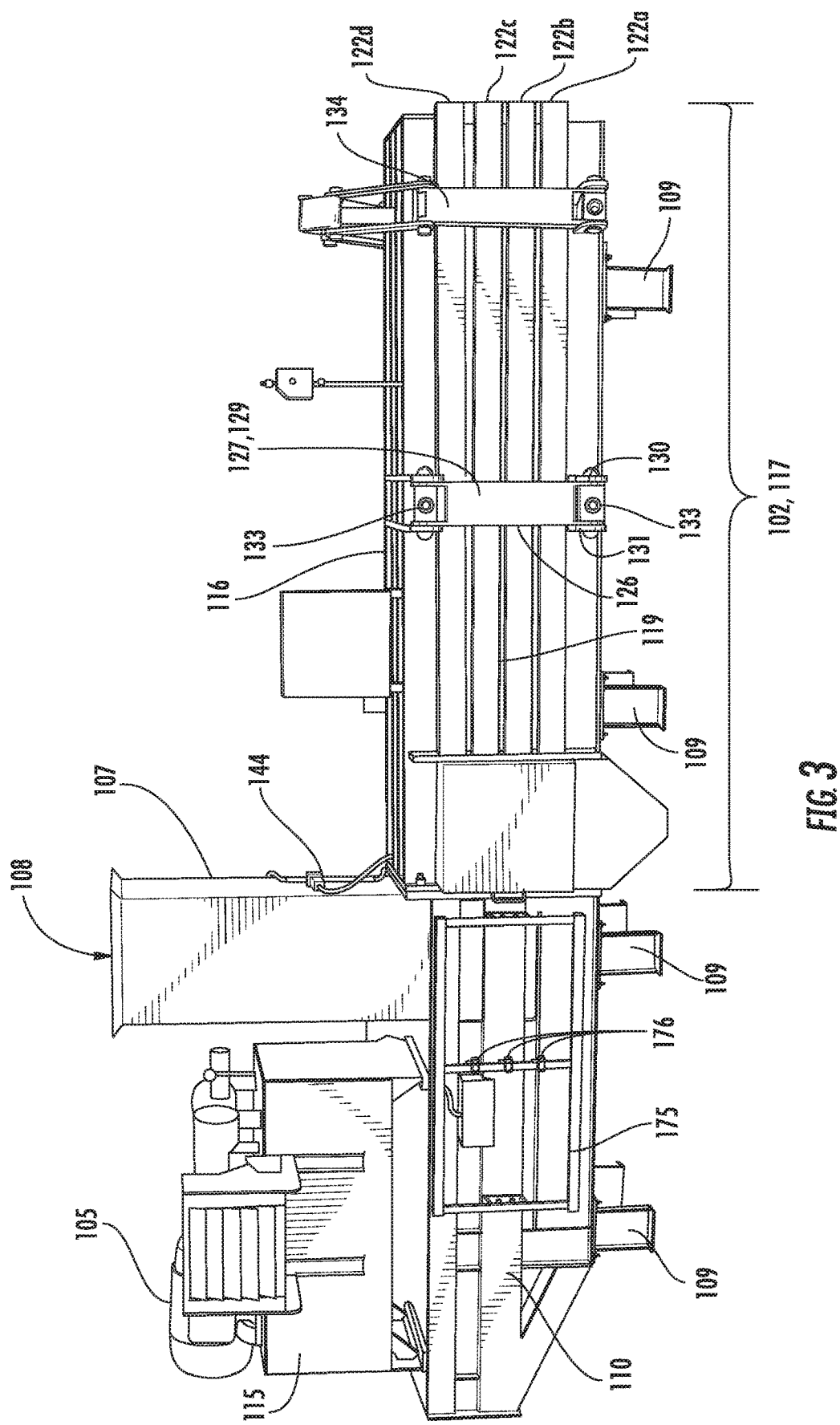

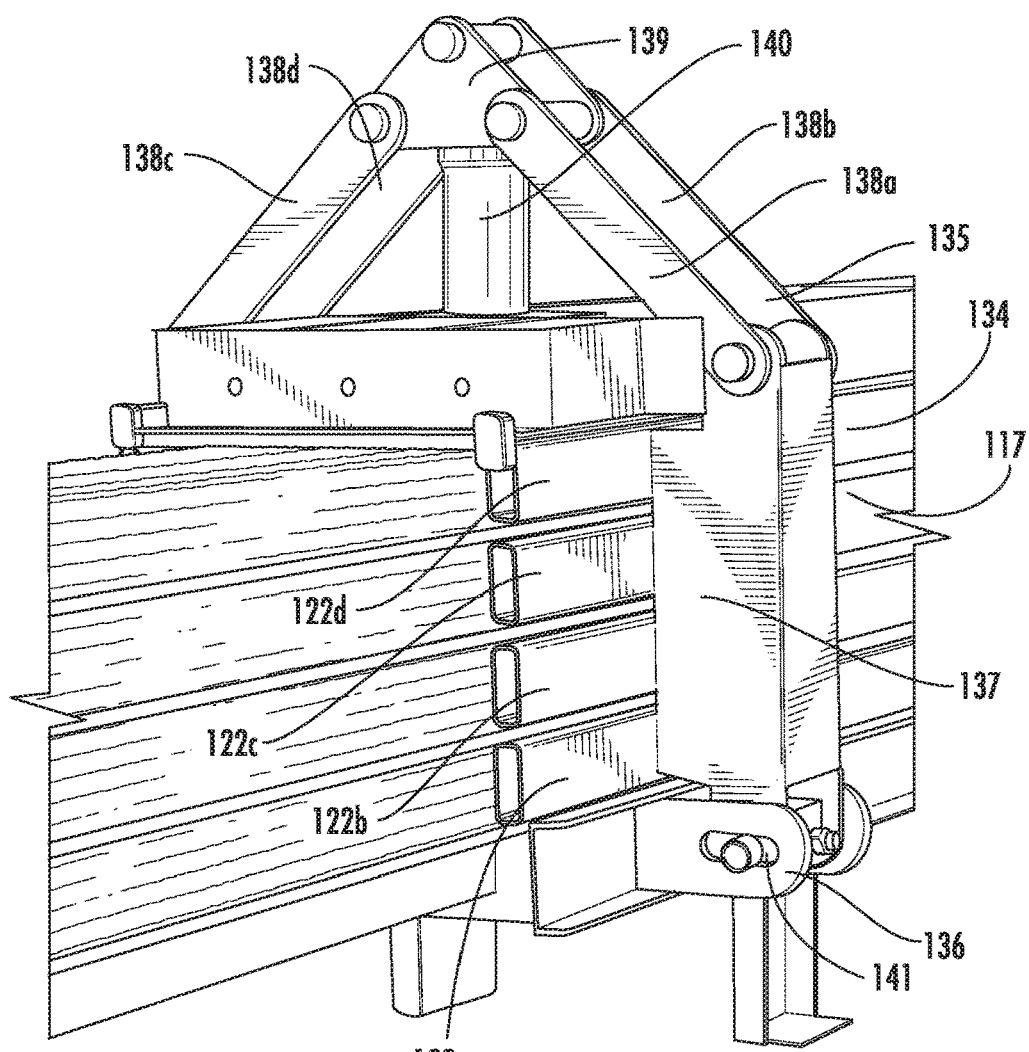
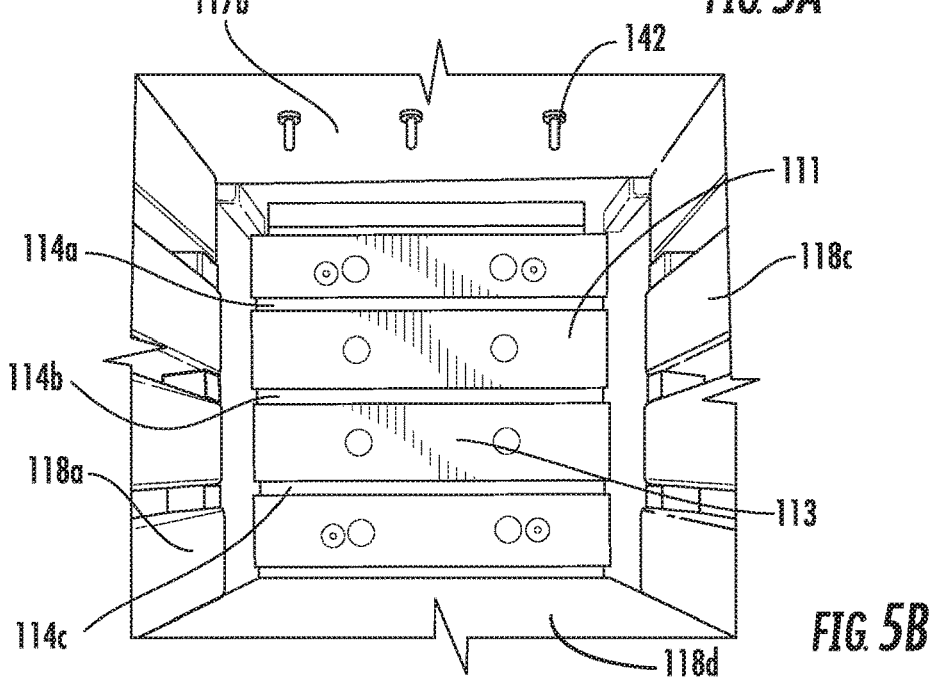

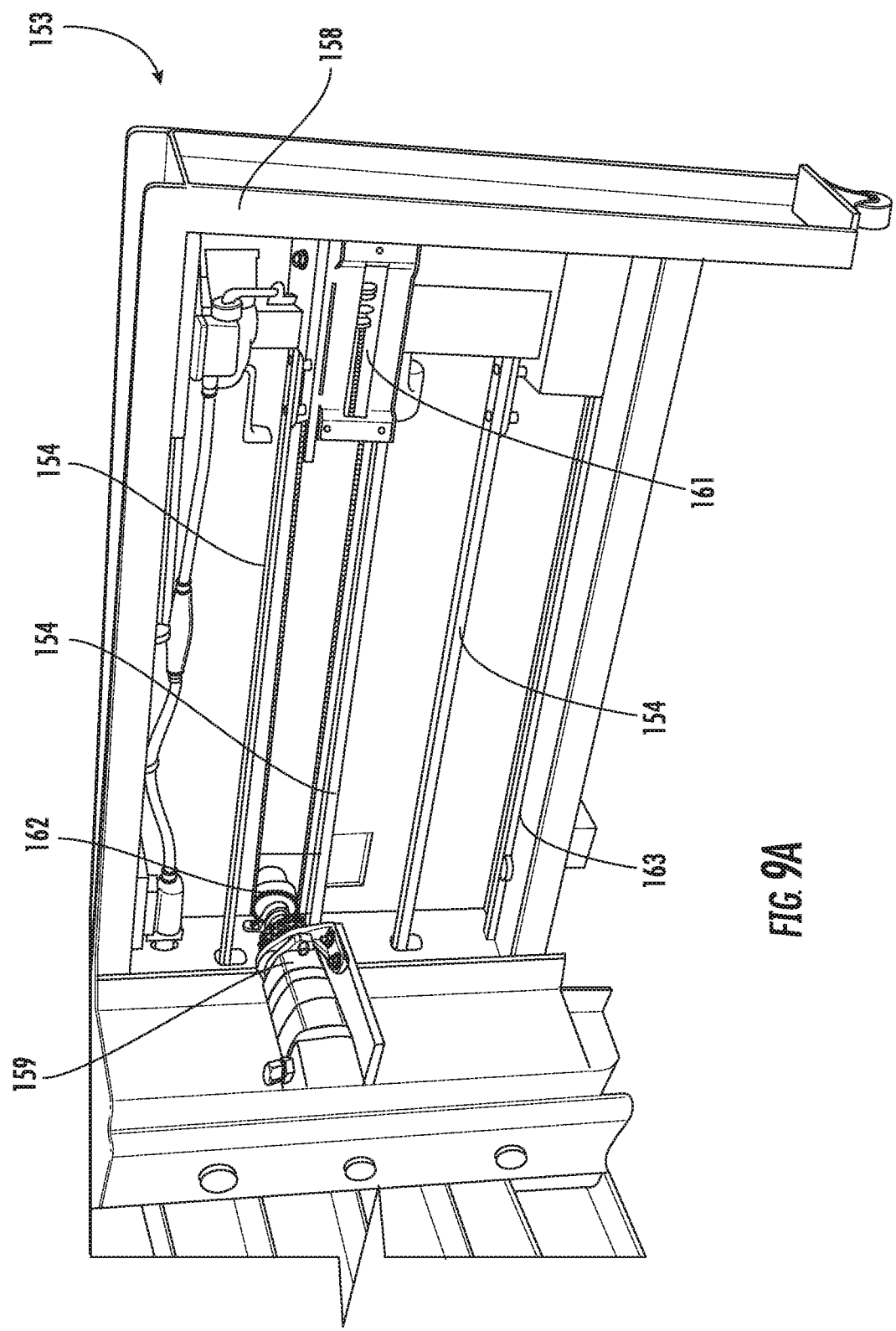

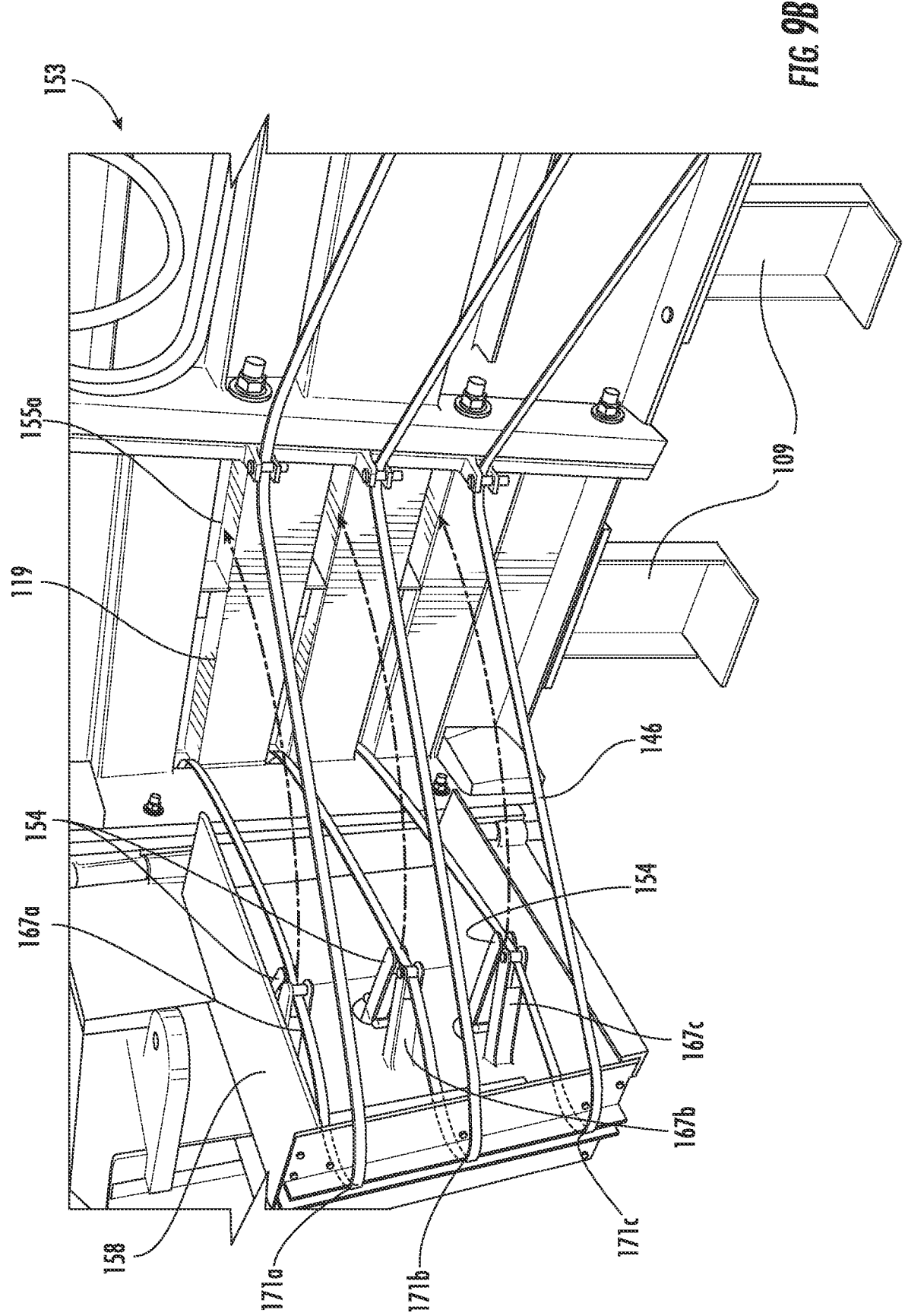

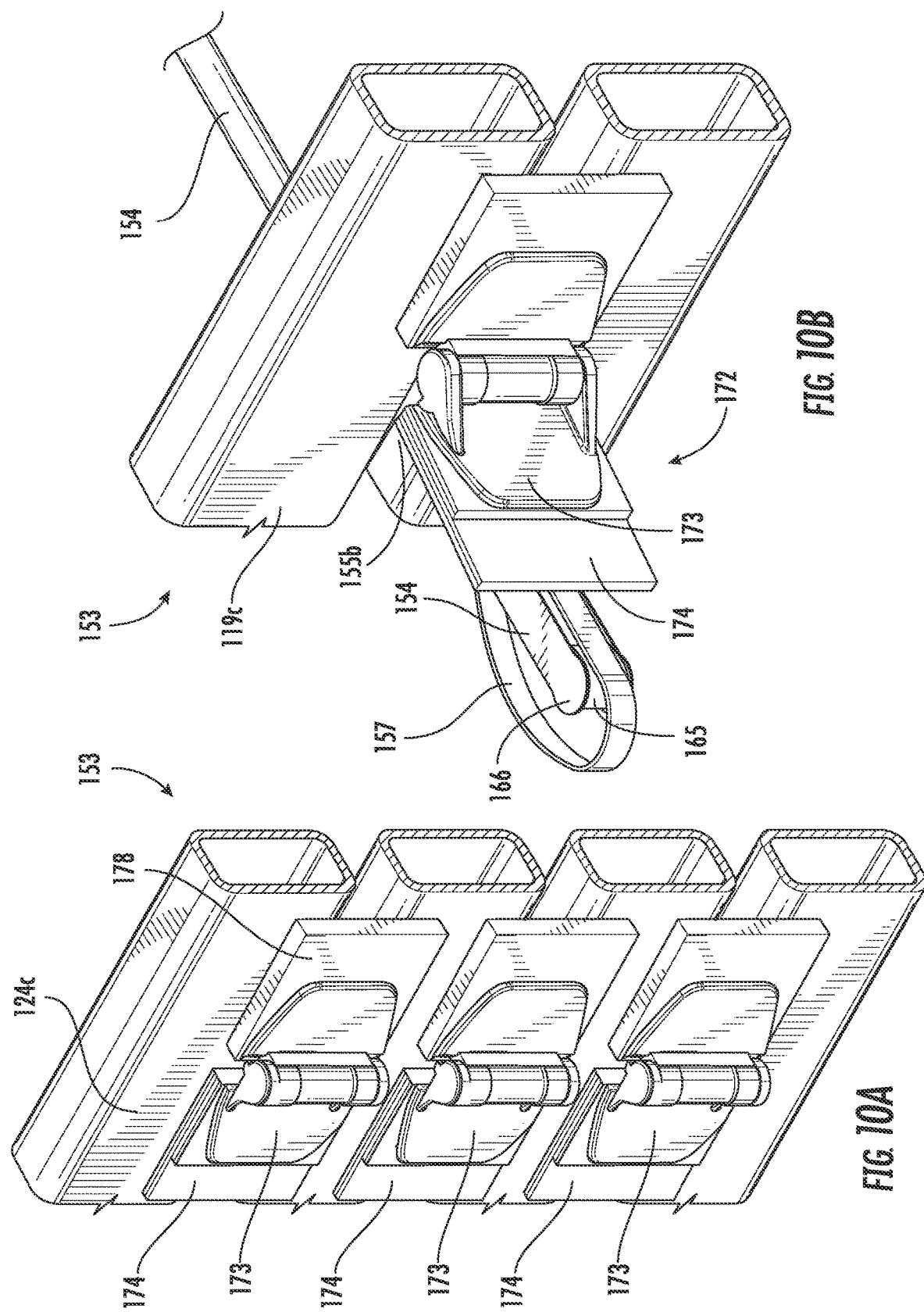

BALING PRESS FOR COTTON GIN TRASH AND OTHER BIOMASS FEEDSTOCK AND METHODS OF USING THE SAME

CROSS REFERENCE TO RELATED APPLICATIONS

This application is a divisional of U.S. application Ser. No. 14/672,179, filed 29 Mar. 2015, which is a non-provisional application of U.S. Provisional Application Ser. No. 61/972,250 filed Mar. 29, 2014. The disclosures of application Ser. Nos. 14/672,179 and 61/972,250 are incorporated by reference herein in their entirety.

FIELD

The invention relates to a baling press for baling cotton gin trash and other particulate biomass feedstock—materials which have proven difficult to form into a bale that substantially maintains its shape and density over time. The invention also relates to methods of producing a bale with the baling press and a bale generated by said press and methods.

BACKGROUND

Particulate biomass waste for example, cotton gin trash, generated in industries such as cotton processing (or "ginning") is exceptionally difficult to form into bales that can be conveniently transported to facilities for use. In most cases, it is not cost effective or economically feasible to transport unbaled materials (with the exception of perhaps cotton seed which is not baled) due, for example, to the transportation costs and small quantity that can be transported. Gin trash is such a material and is the only material generated from cotton processing (other than cotton seed) that, up until this point, could not be baled with consistent success due in part to the physical characteristics of the material and the constraints of conventional balers.

The application of biomass waste to various agricultural, industrial, and energy uses is a growing field/market and finding economic and efficient methods to transport such materials to consumers is much needed. For example, gin trash has been shown to be exceptionally useful as cattle feed filler, as a biofuel, as a soil additive or compost, in fluidized bed gasification processes, and in conversion to packaging material. If gin trash could be baled and transported in an efficient and economic manner, it is predicted that the market for gin trash would flourish and grow. However, as mentioned above, gin trash has proven difficult to bale and transport and traditionally has been either incinerated on site or buried in pits behind the gin. These disposal methods are not ideal and result in significant costs to the cotton gin owner and the environment. Cotton gin owners are also losing a substantial source of additional revenue when the material is disposed of and not sold.

As mentioned above, prior to Clean Air Acts (1970-1975), gin trash was typically incinerated behind the cotton gins. Since then gin trash, for the most part, has been conveyed to an area behind the gin and, mostly during off season, spread back onto cotton fields. A much smaller percent of the gin trash generated has been buried in land fields, used/sold for composting, and in some parts of the cotton belt, processed and used for livestock roughage even though transport was not efficient. However, due to handling and transport cost of low-density (10-12 lbs./cu/ft.) waste material, profitable markets remain elusive. It would be a great advantage to have a baling press that can generate bales with density at or near 27-30 lbs./cu/ft. at the ginning rate (production rate of gin trash discharge) which are capable of dry storage to prevent spoliation, able to be handled multiple times without disintegration, and able to be transported long distances.

Baling properties differ substantially, especially in cotton gin trash, which is in part determined by factors such as weather during growing season and harvest, processed moisture content, type of harvesting machine, condition of harvesting machine, speed of operation of harvesting machine, soil conditions at the exact location where plants are grown, and the variety or varieties of seed planted. Not only do the baling properties of certain organic waste or biomass materials vary between farmers, they vary within farms and harvesting periods. The same variabilities do not exist with easier-to-bale materials such as shredded paper or stems/sticks/flexible organic materials that compress but have a greater degree of physical memory than cotton gin trash or other particulate biomass material.

Conventional baling mechanisms and baling presses for cotton and another cotton gin waste product, cotton motes, are known in the art, for example, U.S. Pat. No. 5,456,075 ("Baling Press"), U.S. Pat. No. 4,512,252 ("Baling Press"); U.S. Pat. No. 4,161,911 ("Presses for Baling Waste Materials"); U.S. Pat. No. 4,566,380 ("Round Baling Press for Agricultural Products"); U.S. Pat. No. 4,805,528 ("Cotton Bale Recompressing and Retying Machine and Process"); and U.S. Pat. No. 4,548,131 ("Mobile Apparatus for the Infield Handling of Fibrous Material"); U.S. Pat. No. 6,941,740 B2 ("Baler Gate Linkage and Latch Structure"); and U.S. Pat. No. 4,391,186 ("Cotton Press"). The aforementioned patents and mechanisms disclosed therein are herein incorporated by reference. While some of the assemblies and mechanisms described in these references are fairly common to balers, these known baling mechanisms are generally unsuitable for baling gin trash and similar biomass materials Another weakness of conventional baling presses is the inability to apply plastic strapping in an efficient, cost effective, low man-power manner. Plastic strapping is often required in the agribusiness (e.g., livestock) field and other fields as well. Plastic strapping may be incinerated with the baled material if need be. There are certain other advantages to plastic strapping such as the width of the straps versus wire—straps being less likely to cut through the bale. Plastic strapping may be cut with a knife blade, but wire cannot. Moreover, workers are more prone to injury from wire than from plastic strapping. Finally, traditional auto-tie mechanisms for horizontal balers have used a set of wire spools on both sides of the press and have tied the bale early in the extrusion process. For material, such as cotton gin trash, with less physical memory than other waste material, early tying has proven difficult because the physical size of the bale is reduced and doesn't rebound as with other materials.

Therefore a baling press for baling biomass feedstock that is difficult to bale, including cotton gin trash, is needed to provide a valuable market and additional source of revenue for the cotton gin owner and a valuable cheap material with multiple uses for consumers. The baling press must generate a bale with sufficient density to hold the material together without disintegration and tie or bind the bale in a manner that promotes this characteristic. The baling press must be able to accommodate in a convenient and efficient manner many if not all of the variables in the physical characteristics of the feedstock material. The bale produced must be capable of efficient and economic stacking, handling, and transport.

SUMMARY

One object of the present invention may comprise providing a baling press for baling cotton gin trash and other biomass feedstock. In some embodiments, the baling press may comprise a general baling press unit with one or more subunits or assemblies. In some embodiments, the baling press unit is modular with detachable components.

Another object of the present invention may comprise providing a baling press with an extrusion chamber assembly. In some embodiments, the extrusion chamber assembly may comprise an extrusion chamber chute of a substantially rectangular cuboid shape and an open bale exit end and a feed stock entry end. The extrusion chamber chute may be detachable from the overall baling press unit.

Another object of the present invention may comprise providing a baling press with one or more tension device(s) or elements for monitoring and adjusting extrusion friction and controlling maximum and minimum bale density. The tension devices(s) may be a part of the extrusion chamber assembly.

Another object of the present invention may comprise providing a baling press with a first tension element to set and/or adjust the minimum tension or pressure applied to the bale as it progresses through the extrusion chamber chute. In some embodiments, the first tension element may be adjusted or set manually through mechanical means such as a bolt and nut assembly or alternatively powered, for example, electric or hydraulic means. In some embodiments, the first tension element is attached to the mid-section of the elongated extrusion chamber chute. In other embodiments, the first tension element may be positioned along the extrusion chamber chute closer to the ram and charge chamber. In some embodiments, the first tension element comprises side brackets, as well as top and bottom mounts. The side brackets may be adjustable for control of the predetermined constrictive force applied to the chute exterior side walls and/or to maintain proper pressure on the forming bale.

Another object of the present invention may comprise providing a baling press with a second tension element for controlling and not exceeding the maximum pre-determined bale density. The second tension element may comprise side brackets, as well as top and bottom mounts. In some embodiments, the top mount may further comprise arms and a triangular bridge which support a hydraulic cylinder. In some embodiments, the second tension element may be powered, for example electrical or hydraulic power. In some embodiments, the second tension element is positioned proximate to the bale exit end of the elongated extrusion chamber. In some embodiments, the pre-determined tension force may be modified by the hydraulic cylinder or electrically activated and controlled mechanical device.

Another object of the present invention may comprise providing a baling press comprising a compression ram assembly. In some embodiments, the compression ram assembly may comprise an internal compression ram with a ram platen. In some embodiments, the platen comprises one or more slots designed to receive and guide a strapping inserter rod or shaft which carries plastic strapping material for ultimate bale tying or binding. In some embodiments, the compression ram assembly further comprises a top plate which may be affixed to the top of a frame for covering the charge chamber opening as the ram travels through the charge chamber and into the extrusion chamber chute. This prevents unwanted feedstock from entering the charge chamber from the infeed chute at certain times during the process.

Another object of the present invention may comprise providing a baling press that applies the necessary compression force for baling cotton gin trash and other difficult to bale biomass feedstock.

Another object of the present invention may comprise providing a baling press that applies manageable charges/laminations for better, more uniform compaction and volume control.

Another object of the present invention may comprise providing a baling press that is capable of conveniently and cost effectively applying plastic strapping material to bind a formed bale.

Another object of the present invention may comprise providing a baling press with an infeed chute assembly positioned proximate and, in some embodiments, above a charge chamber. In some embodiments, the chute assembly is attached to or engaged with the top of the baler structure and includes an access door and one or more viewing window(s). In some embodiments, the infeed chute rests above the charge chamber and allows feedstock to flow from the feedstock supply line into the charge chamber. In some embodiments, the infeed chute assembly further comprises one or more sensors for detecting and controlling the feedstock quantity within the charge chamber and infeed chute.

Another object of the present invention may comprise providing a baling press with a strapping material inserting and positioning assembly. In some embodiments, the strapping used in said strapping material inserting and positioning assembly is flat plastic strapping, however, it should be understood that any strapping material known in the art may work for the intended purpose. The strapping material used may be substantially flat or wide plastic strapping material. The strapping material inserting and positioning assembly may comprise an encasing or housing. In some embodiments, the encasing may be detachably engaged to the extrusion chamber chute by bolt, pin or the like. The encasing may further more comprise hinges which allows the encasing to swing open without full detachment. The strapping material inserting and positioning assembly may comprise one or more inserter rods which transport the strapping material through the extrusion chamber chute and beyond the opposite chute sidewall. In other embodiments, the strapping material inserting and positioning assembly may be connected to either of the extrusion chamber chute sidewalls to transport strapping material for bale tying (density securing) through, across, or in close proximity to the ram platen (ram face) and extend the material a sufficient distance beyond the opposite sidewall such that the operator can have easy access to the extended strapping material to pull and then cut the straps to an appropriate length. The inserter shafts may be actuated and powered by hydraulic, electric, or steam power. In some embodiments, the inserter shafts are guided and by tracks and/or posts and actuated by chain/pulley mechanics. The strapping material inserting and positioning assembly, in one embodiment, may be positioned on a single side of the baling press.

Another object of the present invention may comprise providing a baling press with a baling press unit. In some embodiments, the baling press unit may be engaged to one or more of a compression ram assembly, a hydraulic power unit assembly, electrical control enclosures and control switches, an infeed chute assembly over top an infeed opening to the baling chamber, and/or bolt-on legs to support the complete baling press at a convenient height.

In another object of the present invention, the baling press produces and maintains a consistent compression force for bale formation. In one embodiment, the baling press produces and maintains a compression force of at least about 150 lbs/in$^2$. In another embodiment, the amount of compression force is between about 150 to about 250 lbs/in$^2$. In another embodiment, the amount of compression force is about 200 lbs/in$^2$. The amount of compression force necessary will vary depending on the physical properties of the material being baled influenced by geographic region of origin, moisture content, etc.

Another object of the present invention may comprise providing electrical enclosures for motor starters, system electrical disconnect, transformer, electrical wiring, programmable logic controller, operator interface device, push buttons, electrical sensors, electrical switches, photo sensor(s), and other electrical control components necessary to power the baling press.

Another object of the present invention may comprise providing a hydraulic power unit complete with hydraulic systems components and accessories to provide hydraulic power and control components including the compression ram assembly, extrusion chamber tension device(s), and said bale strapping material inserting and positioning assembly.

Another objection of the present invention may comprise providing a finished bale receiving platform with or without a bale bagging accessory and bolt-on legs to support the complete baling press at a convenient height for the baling press operator's comfort, to aid with area housekeeping, and to provide easy access to the bale for bale removal, handling and/or conveying.

Another object of the present invention may comprise providing a baling press with a strapping material storage and dispensing assembly. In some embodiments, the strapping material storage and dispensing assembly may comprise one or more strapping dispenser units that may be freestanding or, alternatively, attached to the baling press unit or the strapping material inserter assembly. The assembly may further comprise one or more strapping guide elements for proper transport and presentation of the strapping to the insertion assembly for insertion through the extrusion chamber chute. Depending on the orientation of the strapping dispenser units, the guide elements may alter the orientation of the strapping material for proper positioning prior to insertion through the extrusion chamber chute. The strapping material storage and dispensing assembly, in one embodiment, may be positioned on a single side of the baling press, for example, on the same side of the baling press as the strapping material insertion assembly.

BRIEF DESCRIPTION OF THE FIGURES

Representative embodiments of the invention are disclosed in more detail with reference to the following figures.

FIG. 3 shows an overall diagrammatic side view an embodiment of a baling press of the present invention as well as the extrusion chamber assembly.

FIG. 5A-B shows an embodiment of the second tension element (FIG. 5A) and the interior of an extrusion chamber chute and bale retention elements on the top interior wall of the chute (FIG. 5B).

FIG. 9A-C shows an embodiment of the strapping material insertion assembly including an embodiment of the encasing with internal components (FIG. 9A), an embodiment of the encasing in an open position showing inserter shafts, positioning elements, guide elements (FIG. 9B), and an embodiment of the inserter shafts, positioning elements, and guide elements (FIG. 9C).

FIG. 10A-B shows an embodiment of the strapping retention members.

DETAILED DESCRIPTION

The present invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete and convey the scope of the invention to those skilled in the art. Among other things, the present invention may be embodied as methods or devices. The following detailed description is, therefore, not to be taken in a limiting sense.

Throughout the specification and claims, the following terms take the meanings explicitly associated herein, unless the context clearly dictates otherwise. The phrase "in one embodiment" or "in some embodiments" or "in a preferred embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention. In addition the phrase "present invention" or "object of the present invention" does not necessarily refer to nor is intended to limit the invention to the specific embodiment or feature described.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

It should be noted that although the discussions herein may refer to a specific order and composition of method steps, it is understood that the order of these steps may differ from what is described. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present invention. Such variations will depend on designer choice and it is understood that all such variations are within the scope of the invention.

Figure 1:
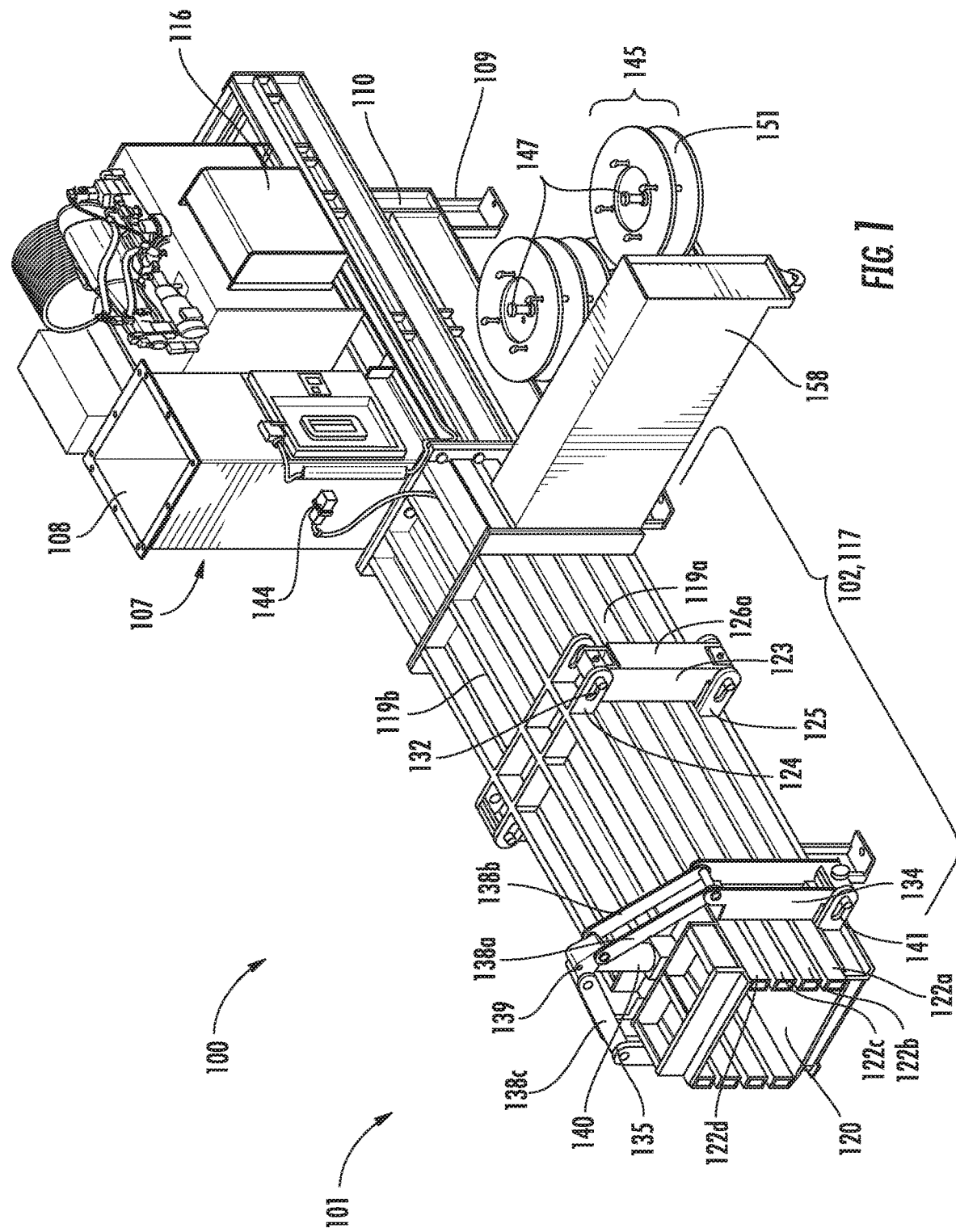
FIG. 1 shows an overall diagrammatic side view of an embodiment of a baling press of the present invention.

Referring now to FIG. 1, some embodiments of the baling press 100 of the present invention may comprise a baling press unit 101. In some embodiments, the baling press unit 101 is modular with detachable components or subunits. For example, in one embodiment, the extrusion chamber assembly 102 (described in more detail below) of the baling press unit 101 may be permanently affixed to the overall unit 101 or, alternatively, may be an independent and detachable component engaged to other components of the baling press unit 101, such as the charge chamber, via bolts, pins, and the like. Said modular aspect is useful for a variety of purposes, including but not limited to convenience in replacing, exchanging, modifying, and/or shipping the baling press 100 components and assemblies. It should be noted that the lines pointing to the extrusion chamber assembly 102 are truncated and do not depict the entire length of the assembly or the extrusion chamber chute. For a better illustration of these components, reference should be made to FIG. 3. Said modular aspect also enables the convenient insertion, removal, or repositioning of spacer elements between the body assembly and the extrusion chamber for inserting header and/or footer sheets or bale separation material. In one embodiment, the extrusion chamber assembly 102 is itself modular and divisible into discrete units which may enhance versatility and promote lengthening or shortening of the extrusion chamber assembly 102 as desired, for example, by addition or removal of separate sections of extrusion chamber. This action may be necessitated by the physical characteristics of the material being baled.

The overall baling press unit 101 is preferably built to absorb and withstand the powerful forces exerted by a connected (e.g., double-acting) cylinder and piston as the piston extends under pressure and pushes the compression ram past the charge chamber and into the connected extrusion chamber assembly 102 and then retracts back to home/resting position toward the rear of the baling press unit 101. The cylinder may include a piston (not shown) for advancing the compression ram (described more fully below) toward the feedstock charge and forming bale. The compression ram's motion is generally along the horizontal plane in relation to the floor surface and potentuated by powered cylinders, such as for example the double acting hydraulic or steam actuated cylinders.

The baling press unit 101 is designed to receive loose cotton gin trash or other small or processed biomass feedstock through an infeed chute assembly and into a charge chamber (or "baling chamber") 103 (best illustrated in FIG. 6B) and, with the attachment of a compression ram assembly 104, compress the feedstock into the attached extrusion chamber 102 by collecting and compressing the material after a charge is loaded into the charge chamber 103.

In some embodiments, the baling press unit 101 may further comprise a compression ram assembly 104, a hydraulic power unit assembly 105, electrical controls 106 (generally also shown in Figures as Control Panels 115) including enclosures and control switches, an infeed chute assembly 107 proximate an infeed opening 108 to the charge chamber 103, and legs 109 (e.g. bolt on) to support the entire baling press unit 101 at proper height for the baling press operator's comfort, to aid with area housekeeping and to provide easy access under the baling press to connect, if needed, dust remediation venting or ducts.

Figure 2:
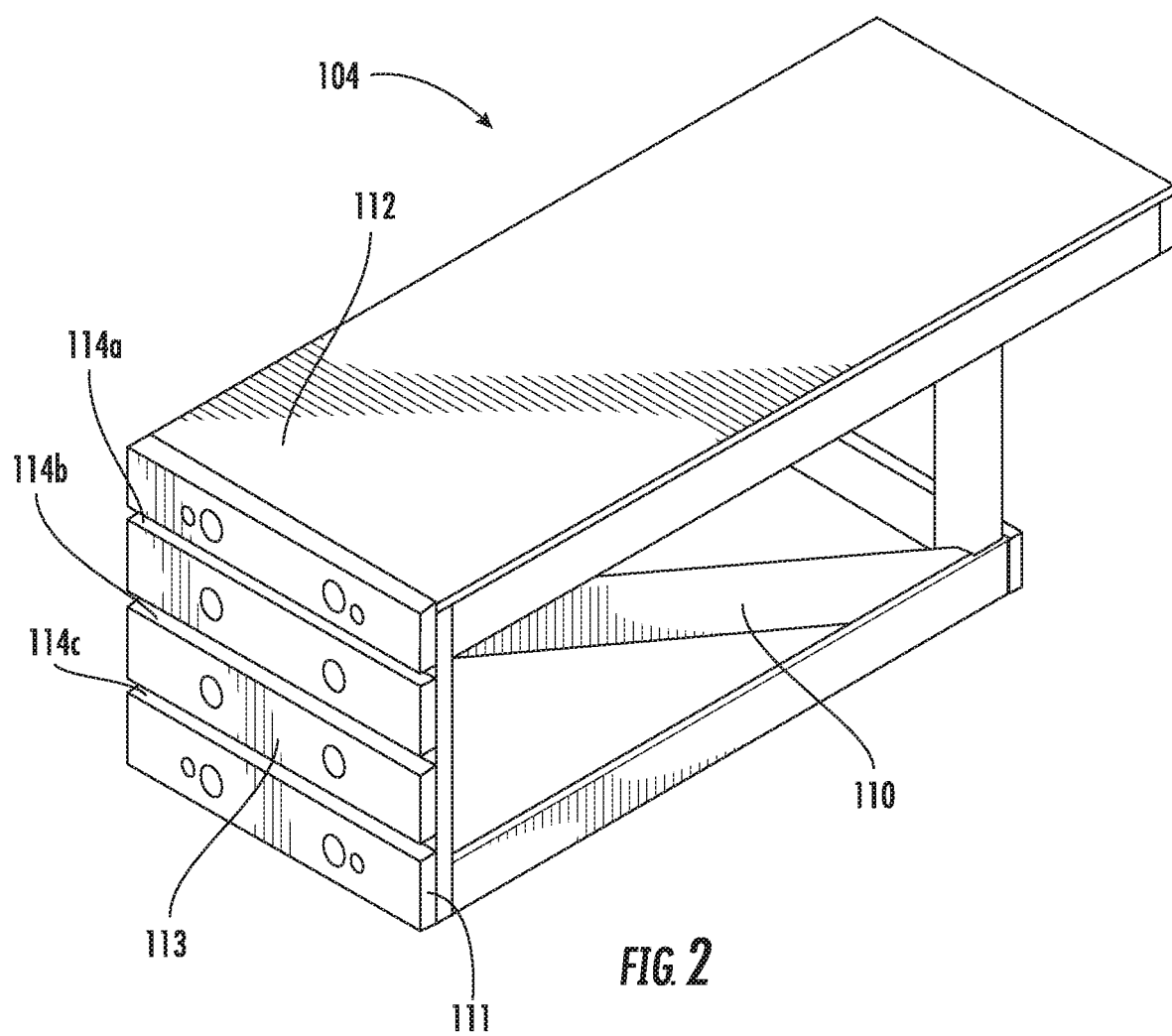
FIG. 2 shows an embodiment of the ram compression assembly and the compression ram.

Referring now to FIG. 2, an embodiment of the compression ram assembly 104 is illustrated. In one embodiment, the compression ram assembly 104 may comprise a frame 110, a cylinder (with piston) (not shown), a ram platen 111, and/or a top plate 112 which may be designed to (for example) close off the charge chamber opening (not shown) as the ram travels through the charge chamber and into the extrusion chamber chute. The cylinder (with piston) may be a hydraulically powered unit and may also be double acting. The cylinder assembly, furthermore may be of sufficient size and durability to deliver up to about 250 pounds per square inch of compression force into the baling chamber and extrusion chambers (between about 150 and about 250 pounds per square inch depending on the feedstock physical properties).

With continued reference to FIG. 2, the ram platen 111 may comprise a first compression surface 113 which contacts and applies a force to the feedstock charge and forming bale. The first compression surface 113 may comprise one or more slots 114a-c which, in one embodiment, are arranged in a horizontal plane to the floor surface and substantially parallel to one another (when more than one is present). The slots may also be arranged in a vertical orientation depending on the orientation of other interacting components, such as the strapping insertion assembly (described below). The platen slots 114a-c are substantially co-planar to the axis of motion of the inserter shafts of the strapping inserter assembly (described in more detail below) and designed to receive the inserter shafts and the strapping material fed there though. The inserter shafts may be manually driven through the slots 114a-c or may be under power.

Figure 6A:
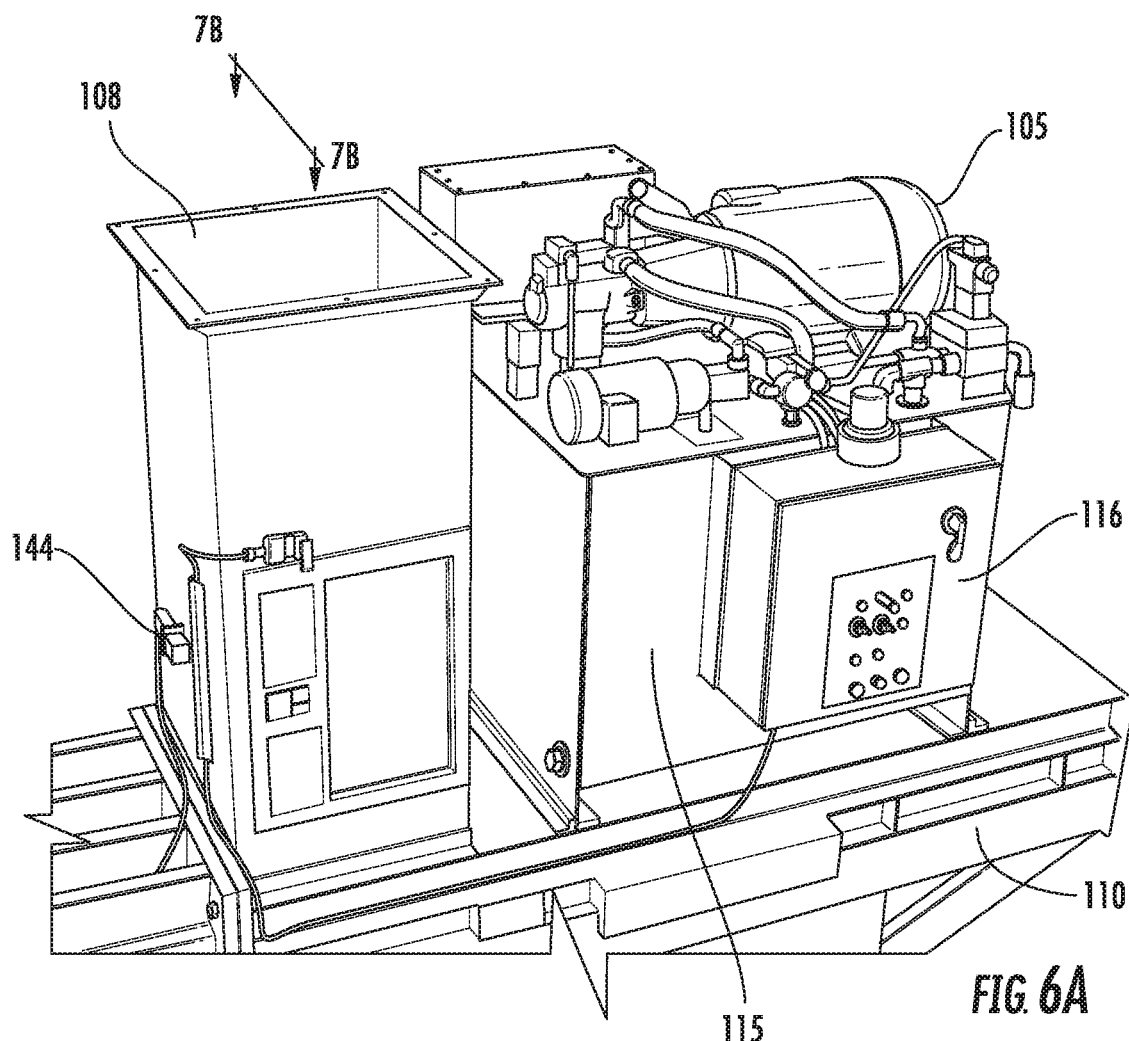
FIG. 6A-B shows an embodiment of the infeed chute assembly and proximate baling press components.

In some embodiments, and as best illustrated in FIGS. 3 and 6A the baling press unit 101 comprises a commercial or custom designed hydraulic power unit 105 complete with a hydraulic fluid storage tank and all hydraulic components needed to power and/or control the powered components and assemblies, including for example, the compression ram assembly, extrusion chamber tension elements, and any optional attached strapping material inserting and preparation devices (described below).

Referring now to FIGS. 1 and 6A, in some embodiments, the baling press unit 101 comprises electrical enclosures 115 and operator control panels 116 to house all required electric and electronic components for function, protection, and safety. Said control panels 116 and electrical enclosures 115 may be positioned at various locations around the baling press unit 101 or may be separate from the unit. Components mounted within the enclosures and panels could include an electric disconnect, motor starters, a transformer, electric relays, terminal strips, wiring, a programmable logic controller, and operators interface items such as push buttons, a touchscreen, and other items. External electrical sensors and switches provide data for systems control, sensor(s) (e.g, photo) provide signals, for example, relating to incoming material to the infeed chute and baler infeed opening, electric solenoids shifts hydraulic valves, and electric pressure switches provide data as to hydraulic pressures.

Referring now to FIGS. 3, 4A-B, and 5A-B, as described previously, the baling press unit 101 may comprise an extrusion chamber assembly 102. As described above, the extrusion chamber assembly 102 may be detachably engaged to the remaining components and assemblies of the baling press unit. In some embodiments, the extrusion chamber assembly's length may be directly proportional to the desired bale width and height and target minimum compression force. In some embodiments, the extrusion chamber length of a 24"×24" extrusion chamber may be about 144". Generally, the extrusion chamber assembly 102 may comprise an extrusion chamber chute 117 generally arranged horizontally and parallel to a floor surface. The chute 117 comprises four interior walls 118a-d and four exterior surfaces 119a-d. The chute 117 may have a substantially rectangular cuboid shape with a bale exit aperture 120 at one end and a feedstock entry aperture 121 (not shown) at the other end near or adjacent to the charge chamber. The chute 117 may be made of metal, preferably steel, and each wall may comprise one or more metal slats 122a-d arranged in parallel to one another.

Referring now to FIGS. 1, 3, and 4A-B, the extrusion chamber assembly 102 may comprise a first tension element 123 engaged at a predetermined position to the extrusion chamber chute 117. Some of the tension element components may be integral to or built into the chamber chute 117 or they may be discrete and independent from the chute. In some embodiments, the first tension element 123 may comprise top mounts 124, bottom mounts 125, and side brackets 126a-b vertically arranged along the extrusion chamber chute's exterior side surfaces. The top 124 and bottom 125 mounts of the first tension element may be permanently affixed (e.g., via weld or other suitable means) to the top and bottom of the extrusion chamber chute 117. Alternatively, the top and bottom mounts may form an integral part of and indistinguishable from the extrusion chamber chute's upper exterior surface and have upper and lower contact points for side bracket 126 attachment. The side brackets 126a-b may be affixed to the top 124 and bottom 125 mounts by weld or other suitable means. In some embodiments, side brackets 126a-b may be housed in casing 127 or, alternatively, exposed and visible to the user.

Side brackets 126a-b may comprise an interior surface 128 (nearest the extrusion chamber chute 117) and an exterior surface 129. However, in some embodiments, the side brackets 126 of the first tension element 123, while vertically oriented to the floor surface and positioned substantially parallel to the extrusion chamber chute's side wall exterior surface, may not be in contact with the extrusion chamber chute's exterior surface while the baling press is at rest and not in operation. The distance between the interior surface 128 of the side brackets 126a-b and the extrusion chamber chute's exterior surface is a predetermined distance and is used to help achieve a minimum preferred bale density by preventing flex of the extrusion chamber chute's side walls (e.g. slats) beyond a certain point during bale formation. This helps to maintain sufficient pressure on the forming bale which is essential for materials that are known to be difficult to bale, such as cotton gin trash. In some embodiments, the side brackets 126 are adjustable whereby the distance between the interior surface 128 of the side brackets and the extrusion chamber chute's exterior surface 119a is either reduced or increased depending on the desired minimum bale density and/or the physical characteristics of the biomass feedstock material. In other embodiments, however, the side brackets are fixed and cannot be adjusted. The side brackets may be engaged or affixed to the top and bottom mounts with a heavy nut and bolt assembly for ease of removal and disassembly.

Figure 4A:
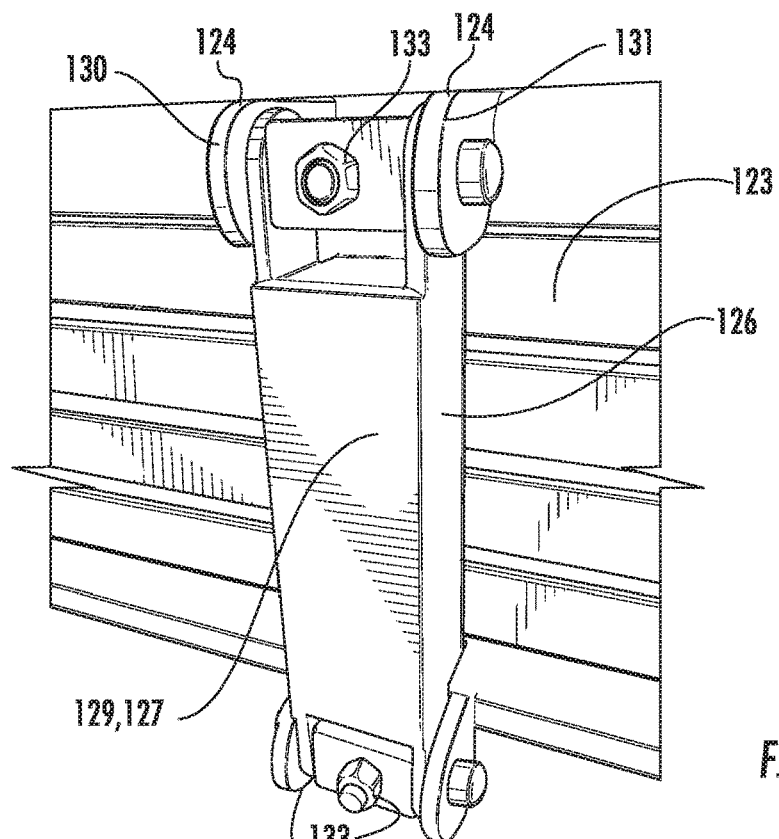
FIG. 4A-B shows an embodiment of a first tension element.
Figure 4B:
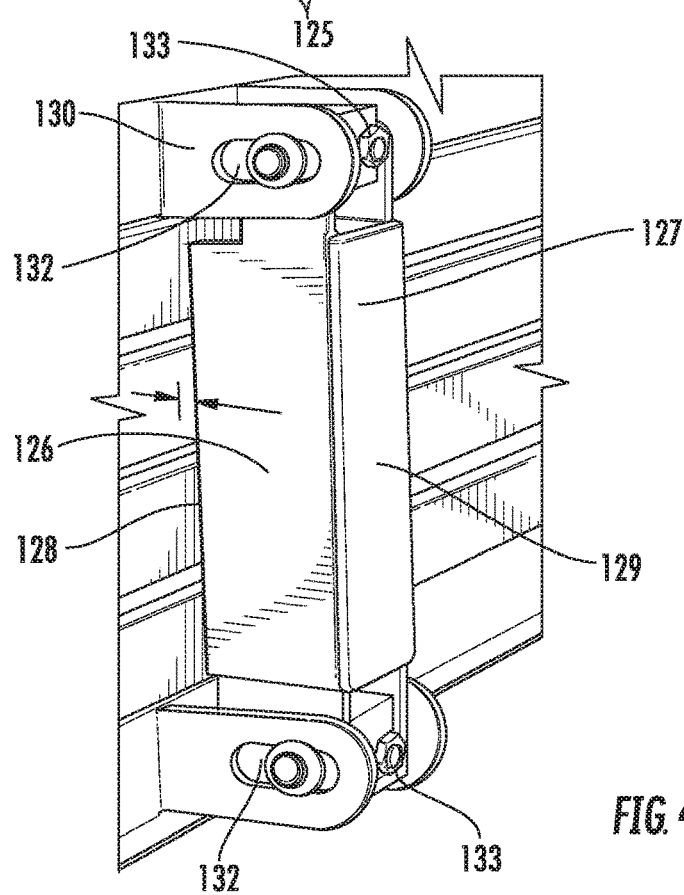

Referring to FIG. 4A-B, the top 124 and bottom 125 mounts may comprise a forward 130 and rearward 131 flanges which are affixed to said side brackets 126. The top and bottom mounts may each further comprise slots 132 for receipt of a bolt/nut or pin assembly. The slots are long enough to allow convenient adjustment of side brackets 126, thereby adjusting the distance between interior surfaces 128 of the side bracket and the chute's exterior surface 119a. This action would be accomplished, for example, by loosening the nut and adjusting or sliding the bolts toward the chute's exterior surface. It should be recognized that first tension element side brackets may be adjusted automatically and powered for example using hydraulic or electrical power. It should also be recognized that a similar mechanical structural configuration as that described below for the second tension element may be used for the first tension element. In such an embodiment, a separate power assembly may be necessary.

The relative position of the first tension element 123 on the extrusion chamber chute 117 is important to desired bale density control. The position may also depend on the length of extrusion chamber chute 117. In some embodiments, the first tension element is positioned at or near the mid-section of the extrusion chamber chute 117. In some embodiments, the position of the first tension element is biased toward the compression ram assembly 104. In some embodiments, the first tension element 123 may be used to maintain the minimum ram face pressure near the center point of the extrusion chamber chute 117 by, for example, adding structural integrity to the walls at that early position. Maintaining the pressure at this position permits release of the higher pressures toward the end of the extrusion chamber chute 117 due to the growing size of the bale via second tension element (described below) without diminishing the minimum force necessary to achieve the target minimum bale density. As discussed above, depending on the desired minimum bale density, the first tension element's lateral elements or side brackets 126 which are positioned substantially parallel to the extrusion chamber side walls may be set at a predetermined width for controlling and retaining the minimum desired bale density which in turn could affect total final extrusion chamber bale density. The tension element 123, in essence, restricts the degree of flex experienced by the side walls of the extrusion chamber chute 117 due to forces exerted by the forming bale. This pre-setting may be performed and powered manually, electrically, and/or hydraulically. For example, manual presetting may be accomplished by heavy duty, industrial quality nuts and bolts 133 as depicted in FIG. 4B. The first tension element 123 may also be used to provide structural reinforcement to the extrusion chamber chute 117 as needed to withstand the high compression force (i.e. to allow use of a relatively light-weight structure).

The extrusion chamber assembly 102 may comprise a second tension element 134 engaged at a predetermined position about the exterior of the extrusion chamber chute 117, preferably proximate to the bale exit end 120 of the extrusion chamber chute 117. The second tension element 134 may comprise top mounts 135, bottom mounts 136, and side brackets 137. Said top mounts may comprise four arms 138a-d extending at an angle up to a triangular bridge 139. The triangular bridge 139 may further support a hydraulic cylinder 140 which when activated moves arms 138a-d causing side brackets 137 to move toward the chute's exterior side wall surface 119a applying pressure to the same. This process is explained in more detail below. Said arms 138a-d may be engaged to the bridge 139 in a manner that allows movement between the arms 138 and the bridge 139. Similar to the bottom mounts of the first tension element 123, the bottom mounts 136 of the second tension element 134 may further comprise slots 141 for receipt of a bolt or pin assembly for side bracket adjustment at the bottom only.

In some embodiments, the second tension element 134 is automatically activated and is designed to control and restrict the maximum pre-determined bale density, which, if exceeded, might potentially utilize excessive energy, require larger and more costly structures, or damage the extrusion chamber chute 117 or baling press unit 101. In one embodiment, the predetermined tension force of the second tension element 134 may be modified by hydraulic cylinder(s) or other electrically activated and controlled mechanical device(s). In one embodiment, the force applied by the tension cylinder 140 or electrically activated mechanical device is that which is necessary to maintain but not exceed a desired compression force necessary for successful bale formation and density. In some embodiments, in operation, as the hydraulic cylinder 140 is activated, the side brackets 137 are forced inward applying pressure on the extrusion chamber chute's exterior surface 119a and thus the bale within the chute 117. If it becomes necessary, due to choking of the extrusion chamber by the bale being extruded, the force exerted by the second tension element 134 may be deactivated, released, or adjusted (manually or automatically) such that friction on the bale is minimized thereby allowing the bale to advance and proceed through chamber opening.

As discussed above, in some embodiments, it is important that an actual delivered compression force ranging between about 150 to about 250 pounds per square inch ("PSI") is maintained to produce bales of cotton gin trash and some biomass feedstock to a final density that can be easily handled, handled repeatedly, stored, or economically shipped to remote destinations on flatbed trailers, inside van trailers, or inside sea containers. As mentioned in the Background section, gin trash and other particulate biomass feedstock is difficult to bale and, without the proper bale density, the bales will disintegrate. The above described combination of design features of the extrusion chamber assembly provides sufficient resistance/friction to achieve and maintain 150 to 250 PSI of force by the compression ram on the bale. The actual delivered compression force will vary due to physical differences in ever changing lots of gin trash and must be adjusted depending on the lot. When properly adjusted, the ram face compression force may fluctuate between about 150 PSI and 250 PSI to compensate for the frequently changing baling properties associated with this type of materials. In some embodiments, the desired actual delivered compression force produced by the compression ram is 200 PSI. It has been observed under certain conditions, that when ram face exceeds about 250 PSI, the baling extrusion chamber is prone to choking (ram does not have enough power to move forward) when exerting the maximum required compression force of about 200 PSI (compression force required to achieve up to ~30 lbs./cu bale density). Therefore, in some embodiments, the desired actual delivered compression force by the compression ram is an average of about 200 PSI. Depending on the material characteristics and other factors, a forward ram hydraulic system pressure of (e.g., 1750 PSI) may be used as an indicator of targeted minimum ram face pressure along with, for example, actual extruded completed bale characteristics. For example, 1750 PSI hydraulic system pressure may equal approximately 150 PSI of ram face force.

Referring to FIG. 5B, to help retain and build upper bale density and to help prevent slippage of the forming bale toward the compression ram (e.g. back sliding), the extrusion chamber assembly 102 may comprise one or more retention elements 142 positioned on or embedded within the extrusion chamber chute's interior wall 118a-d (to aid in retaining looser unrestrained gin trash or biomass materials on the upper portion of the extruding bale formation, which in turn helps avoid excessive lower bale density). The retention elements may be spring loaded or stationary. Combining this feature with the higher-than-normal density of the material under compression within the extrusion baling chamber promotes bale formation with sufficient upper bale density (as needed to achieve the overall weight and average density) for efficient handling and shipping. The retention elements may be designed in various ways. In some embodiments, retention elements 142 may only be installed in the extrusion chamber chute's top interior wall. FIG. 5B shows one possible embodiment, but further embodiments are also possible within the scope of the invention.

Also in some embodiments, the extrusion chamber assembly may comprise one or more supports engaged to the underside of the assembly, such as for example, bolt-on legs 109 to support the complete extrusion chamber assembly at a convenient height for the baling press operator's comfort, to aid with area housekeeping, and to provide easy access under the extrusion chamber assembly to connect, if needed, dust remediation collection chambers, venting or ducts.

For particulate material such as gin trash it is of notable importance to proper bale formation (e.g. proper density and size) to ensure that a full charge of material is delivered with each cycle of the ram. This helps to ensure that the top section of the bale of consistent density (top and bottom) is formed rather than a bottom heavy bale. Referring now to FIGS. 1, 3, and 6A-B, which are illustrative of an embodiment, the baling press unit 101 of the present invention may comprise an infeed chute assembly 107. In some embodiments, the infeed chute assembly 107 may comprise an infeed opening 108 measuring the approximate width and length of the charge chamber opening 143 (not shown) with the infeed chute height sufficient to allow an incoming buildup/storage of feed stock material. When the compression ram is cycling forward through the charge chamber and into the extrusion chamber chute incoming material may be accumulating on the top plate of the compression ram assembly. In some embodiments, attached to the interior wall (e.g. two side walls) of the infeed chute is at least one sensor 144 which may be located about 12" above the charge chamber. In some embodiments, if the sensor remains blocked for a predetermined period of time (e.g., 2-3 seconds), the compression ram will cycle facilitating a leveling of the material prior to each compression ram cycle such that a full cross-section of material is compressed into the extrusion chamber. For example, if the ram cycles prior to material accumulating to the level of the sensor, then upper bale density may be too low and lower bale density too high resulting poor bale integrity. This difference in density may be due to an insufficient amount of material being compressed into the upper section of the extrusion chamber.

Figure 6B:
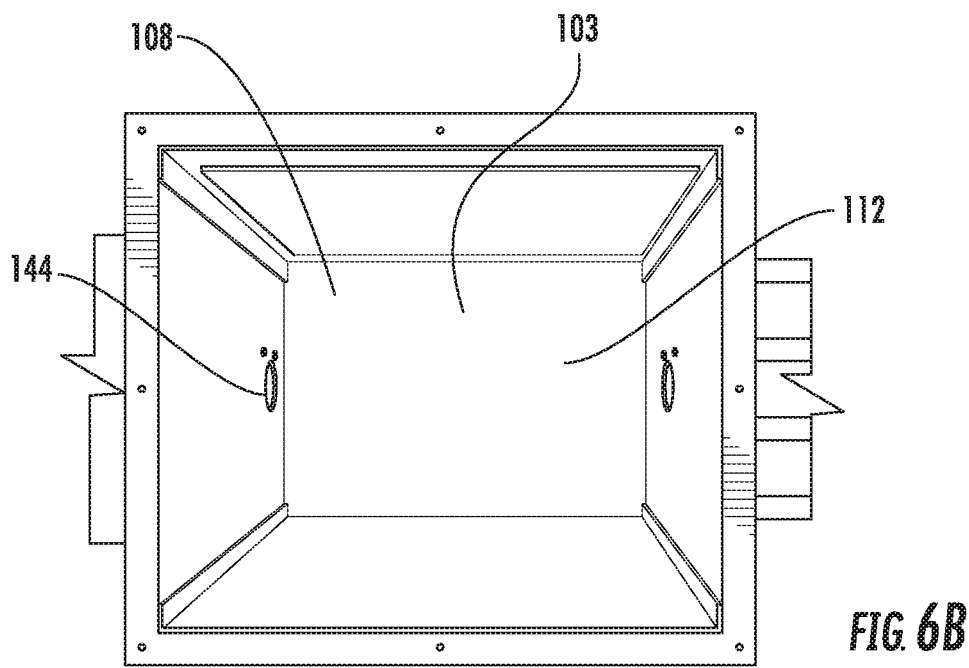

Referring to FIG. 6A-B, conventional balers are equipped with a minimum infeed opening 108 length of approximately 30". In some embodiments and under certain conditions, it was determined that a narrower infeed opening achieved more consistent bale compaction (consistent optimal density) with a more consistent finished bale length. A narrower infeed opening length may be suitable with biomass materials, or other materials, that are particulate and not prone to choking or bridging the chute. Such a size restriction produces smaller laminations or charges which unexpectedly improved the overall bale density and quality. In some embodiments, the desirable infeed opening is about 24 inches wide and between about 15 and 24 inches long. In some embodiments, the infeed opening is preferably about 24 inches wide and 15 inches long.

Figure 7A:
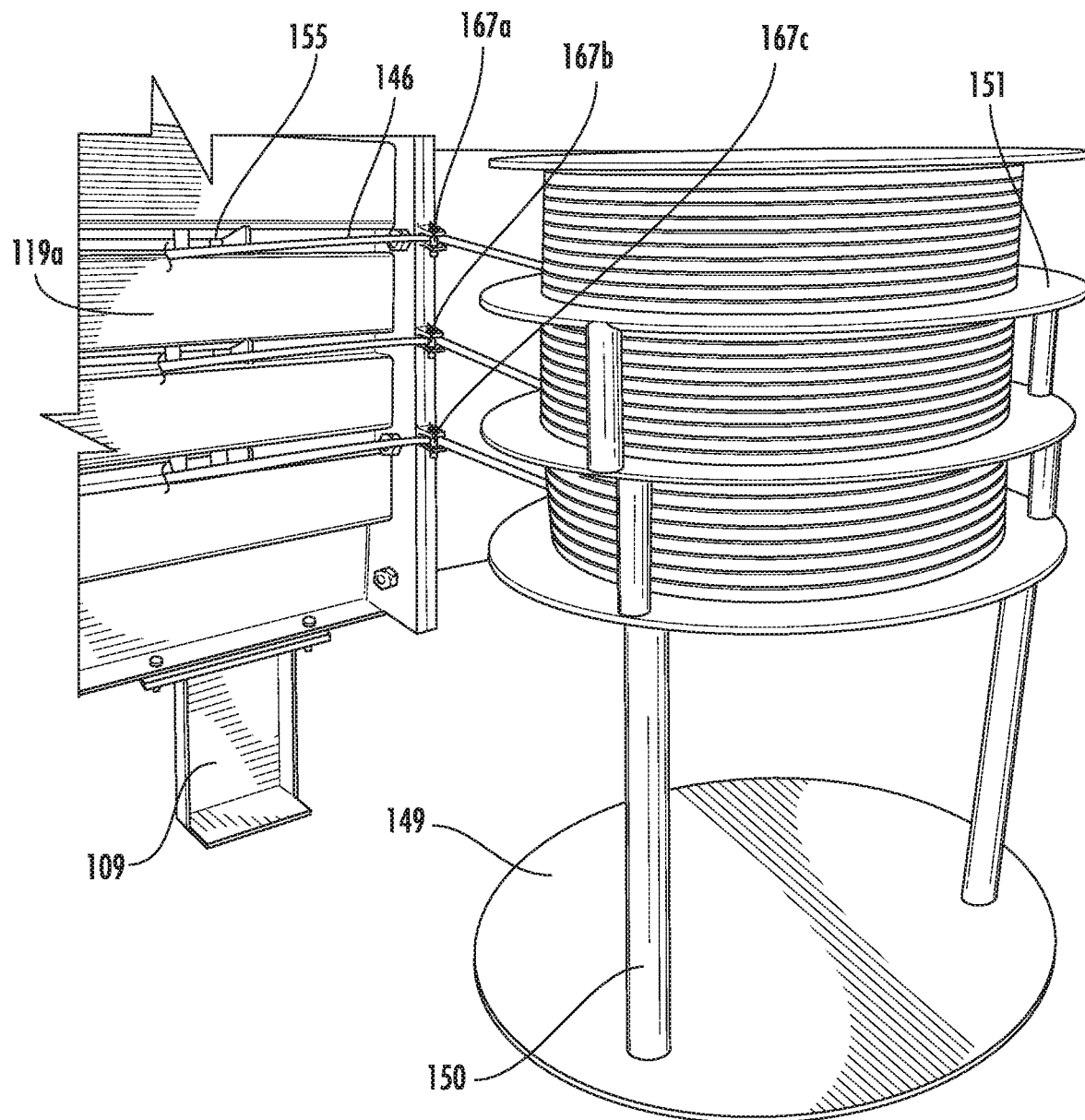
FIG. 7A-B shows an embodiment of the strapping storage and dispensing assembly in freestanding form.
Figure 7B:
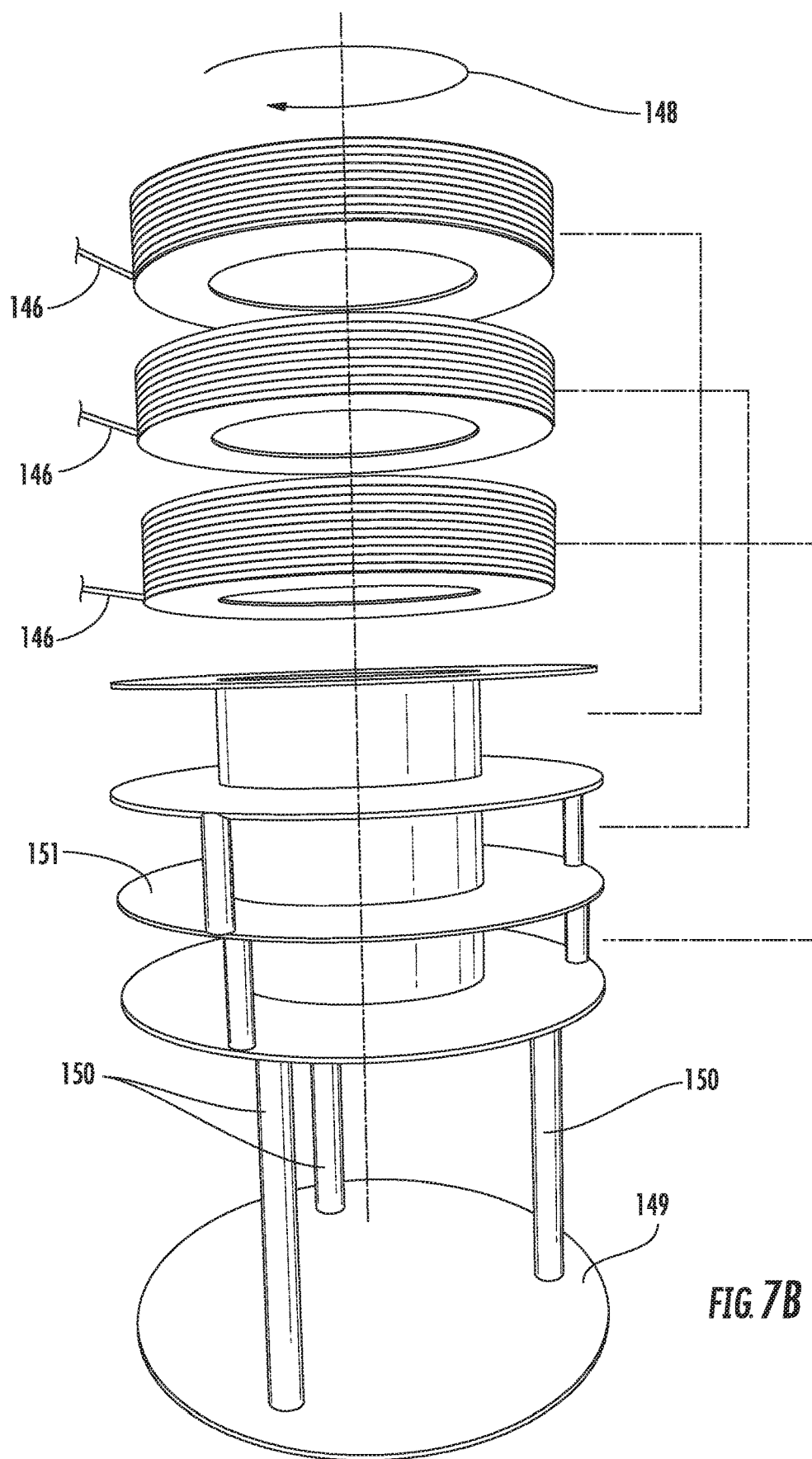
Figure 8:
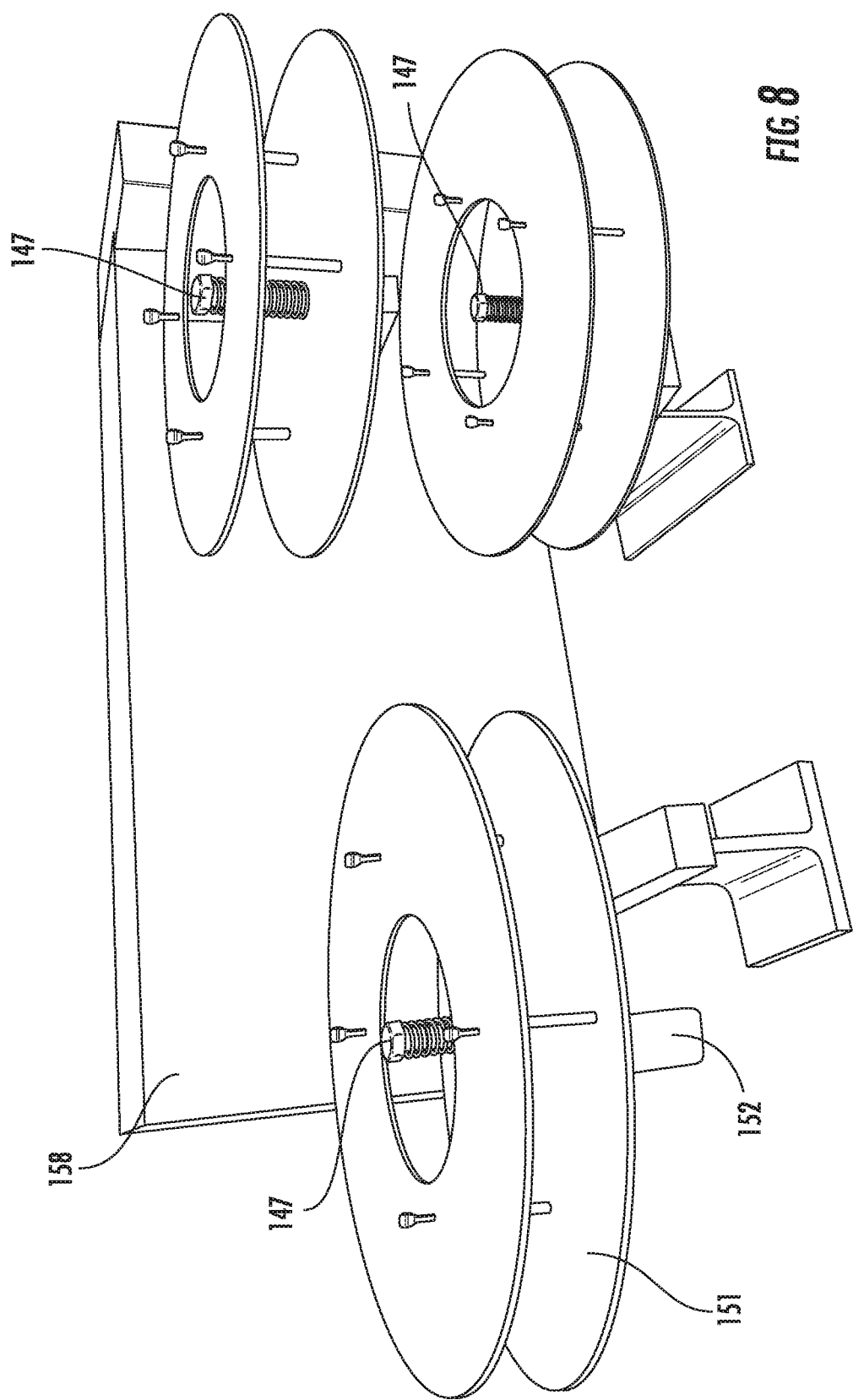
FIG. 8 shows an embodiment of the strapping storage and dispensing assembly in attached form.

Referring now to FIGS. 7A-B and 8, which are illustrative of embodiments, the baling press unit 101 of the present invention may comprise a strapping storage and dispensing assembly 145 for convenient storage and delivery of strapping material to the bale strapping insertion assembly (disclosed and described below). In some embodiments, the strapping storage and dispensing assembly 145 may be freestanding and proximal to the extrusion chamber chute 117 and bale strapping insertion assembly. In other embodiments, the strapping storage and dispensing assembly may be affixed to the overall unit, for example, the bale strapping insertion assembly or the side wall of the baling press unit 101, for example, below the electrical, infeed chute assembly, and hydraulic components. Functions of the strapping storage and dispensing assembly include, but are not limited to storing spools/rolls of strapping material 146 (or other bulk storage form), positioning each spool or roll of strapping material in a manner so as to promote even and continuous pulling or feeding without twisting or binding, of the strapping material into the bale strapping insertion assembly device, and provide an adjustable amount of resistance or tension as the strapping material is dispensed (which occasionally causes minor loosening of the spooled material).

With continued reference to FIGS. 7A-B and 8, in some embodiments, the storage and dispensing assembly 145 comprises a strapping material support post 147 for spool or roll support and rotation about a defined axis of rotation 148. In some embodiments, three rolls of strapping may be stacked upon support post 147. The three rolls and the strapping emanating therefrom may be paired to and substantially planar with a corresponding inserter shaft (described below) of the bale strapping insertion assembly. The storage and dispensing assembly may comprise a base 149, one or more legs 150 (which may be adjustable) for elevation of the spools and/or rolls to the proper height, spacer elements 151 inserted between the spools to avoid unnecessary friction between the spools upon rotation, and a cap or lid (not shown).

As discussed briefly above, in some embodiments, the strapping storage and dispensing assembly 145 may be affixed to the overall baling press unit 101. For example, the strapping material storage and dispensing assembly may be affixed to the rear of the encasing or frame for the strapping insertion assembly (described below). In said embodiment, legs may be unnecessary as long as the spools are positioned such that the strapping is dispensed at the proper elevation for delivery to the corresponding inserter shafts and through the extrusion chamber chute 117. In some embodiments, all strapping rolls or spools may be stacked together or they may be separated and placed upon different dispensing assembly units, for example, as illustrated in FIG. 8. Where the legs are not used the dispensing units may be mounted to (e.g., via weld) the encasing for the inserter assembly via bar support 152 or the like.

Figure 9C:
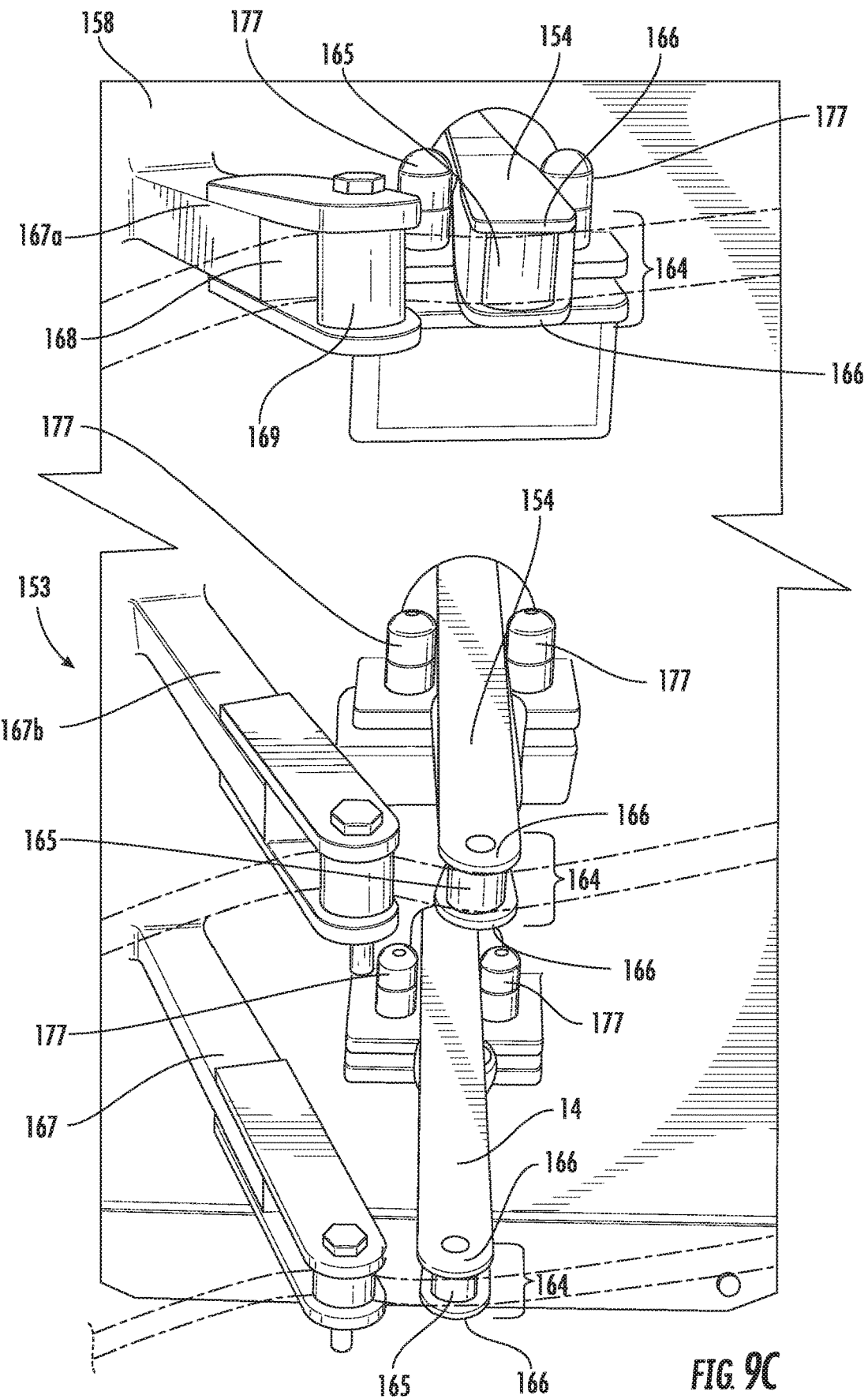

With reference to FIGS. 9A-C, in some embodiments the baling press unit 101 may comprise a bale strapping insertion assembly for positioning and cutting strapping properly for eventual tying, for example, at or near the bale exit opening of the extrusion chamber chute. The bale strapping insertion assembly 153 may be positioned on either side of the extrusion chamber chute 117, but in some embodiments it is positioned on the same side as the strapping storage and dispensing assembly. In some embodiments, the bale strapping insertion assembly 153 may comprise at least one strapping inserter shaft 154 for automatic and mechanical insertion of strapping material, as it is fed or received on plane from the strapping storage and dispensing assembly 156 (not shown), through a channel or aperture 155*a* (shown in FIG. 9B) within the side wall of the extrusion chamber chute 117 and out the second channel or aperture 155*b* (shown in FIG. 10B) in the opposite side wall of the extrusion chamber chute 117. The strapping material may be inserted as a loop. In other words, the strapping material is positioned across the end of the inserter shaft(s) and is forced through the aforementioned structures uncut. The result is a loop 157 exposed on and extending from the opposite side of the extrusion chamber chute and retention members (described below). The loop is formed by reversing the inserter shafts a few inches as well as the force applied by the pads on the retention members (described below). It has been observed that reversing the inserter shafts back to home position sometimes pulls the strap back into the ram face.

In one embodiment, the bale strapping inserter assembly comprises three strapping inserter shafts 154 housed within a standing frame or encasing 158 and arranged in parallel along a central longitudinal axis running lengthwise down the shaft and substantially horizontal to the floor surface. The frame or encasing 158 may be detachably engaged to the first side wall 119*a* of the extrusion chamber chute 117 and may comprise a drive assembly 159 for driving the shafts through the extrusion chamber chute 117 as well as a guide assembly 160 (e.g., track 163 and posts 177) for ensuring substantially consistent, planar and linear motion of the shafts 154 housed in the encasing 158 into and through the extrusion chamber chute 117. Failure to achieve this consistent and precise motion may result in damage to the mechanism including the encasing 158, inserter shafts 154, and/or ram platen 111. In some embodiments, the drive assembly is hydraulically powered or electrically powered. The shafts may be driven by rack and pinion mechanics or other means. With reference to FIG. 9A, in one embodiment, the shaft(s) are substantially secured or affixed to a drive shaft 161 powered by chain/pulley mechanism 162 and guided by track 163 affixed to the bottom of encasing. However, it may be appreciated by one of skill in the art that the insertion of said inserter shafts 154 through the extrusion chamber chute 117 may be performed entirely manually without the need for an encasing 158, drive assembly 159, or guide assembly 160.

Referring now to FIG. 9C, the inserter shaft(s) 154 may comprise strapping material positioning elements 164 on the end of said shaft that receives the strapping for insertion through the extrusion chamber chute 117 and ram platen 111. In some embodiments, said positioning elements comprise a substantially rounded platform 165 and one or more flanking flanges 166 wherein the strapping rests flat against the platform 165 and is held in place by the one or more flanking flanges 166. In this position, the strapping is held ready for insertion into the extrusion chamber chute 117 through the apertures 155 on the first side wall of the extrusion chamber 117 as the inserter shaft 154 advances. In some embodiments, the encasing may have one or more posts 177 flanking the inserter shafts to help prevent unwanted lateral movement of the inserter shafts as they are deployed.

With continued reference to FIG. 9C, the frame or encasing 158 may additionally comprise one or more strapping guide elements 167 which receive strapping material from the strapping material storage and dispensing assembly 145 and orient the strapping for proper placement on the strapping positioning elements described above. The guide elements 167 may comprise a low friction surface 168 which the strapping may contact and one or more rollers 169 with strapping material inserted between the low friction surface 168 and roller 169. The guide elements 167 may be welded to the side of the encasing and positioned co-planar to the inserter shafts for proper placement of the strapping onto the inserter shaft positioning elements 164. Said guide elements 167 may be adjacent said positioning elements 164 or may be located at other places along the assembly, for example, on the side wall of the extruder chamber chute 117 itself or on the back of the encasing, such as when the material strapping storage and dispensing assembly is affixed to the rear of the encasing. The guide elements 167 adjacent to the inserter shaft 154 may be affixed to (at the terminus) of an extension rod or shaft 170 to position the strap near and substantially coplanar with the positioning elements 164. Additional guide elements 167 may be affixed to the side wall of the extrusion chamber chute 117 as illustrated in FIG. 9B. In embodiments of the strapping support and dispensing assembly where the strapping dispensing units are mounted to the side of the baling press unit 101, for example, the extrusion chamber guide elements that rotate the strapping 90 degrees to the proper orientation for insertion may be necessary and used. The frame 158 or encasing may further comprise feed slots 171a-c wherein the strapping enters the encasing 158 proximate to the guide elements 167a-c and inserter shafts.

Referring to FIG. 10A-B, in some embodiments, the baling press further comprises strapping retention members 172 on the opposite side of the extrusion chamber from the bale strapping insertion assembly 153. The strapping retention members 172 are designed to grip and substantially hold the strapping material (e.g., in loop formation) in place once the material exits the extrusion chamber on the opposite side from the bale strapping insertion assembly. It was observed that the retention members help to prevent the strapping material from slipping back into the extrusion chamber inserter shafts are retracted. With reference to FIG. 10A-B, in some embodiments, the strapping retention members may be spring-loaded resistance pads, gate hinges, or a combination of both. The strapping retention members may comprise a flap or gate 173 cover that overlays an aperture in the side wall of the extrusion chamber. The aperture is designed to receive the one or more insertion shafts which have carried the strapping material through the extrusion chamber to the opposite side. As the insertion shaft is retracted by the bale strapping insertion assembly, the strapping material is left (or retained) by the strapping retention members 172 in the form of a loop 157 via pressure exerted by the gate. The strapping retention members 172 may comprise additional resistance pads 174 to prevent unwanted abrasions or fractures of the strapping material as the material is pulled away from the side wall and cut to size either manually or mechanically. In some embodiments, resistance pads may be positioned and engaged to the rear face of the gate that contacts the strapping material. Strapping retention members 172 may further comprise dust shields to prevent unwanted dust from exiting the extrusion chamber.

Figure 11A:
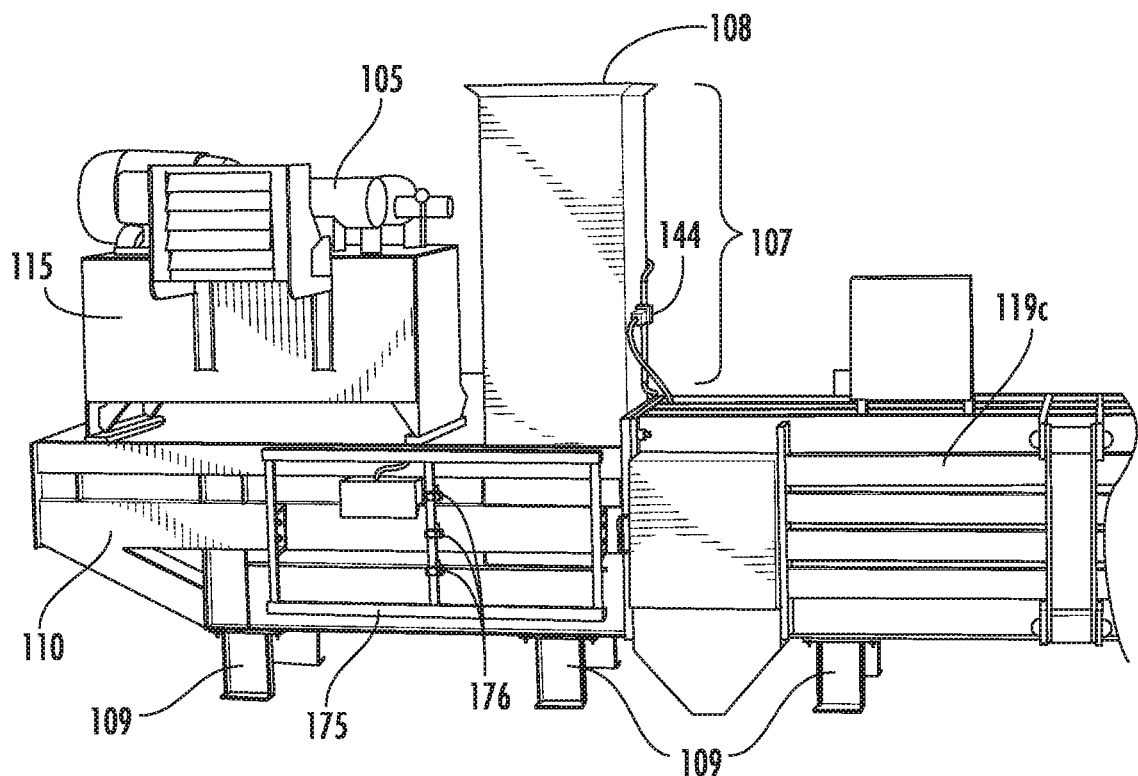
FIG. 11A-B shows an embodiment of the strapping stretcher element.
Figure 11B:
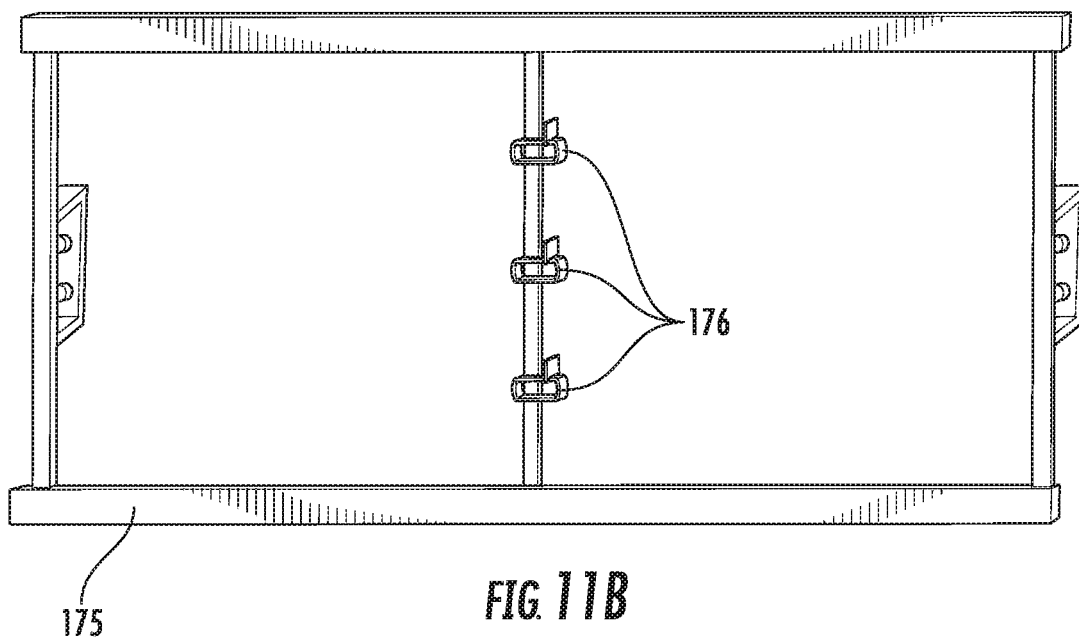

Referring now to FIG. 11A-B, the bale strapping insertion assembly 153 may comprise a stretcher element 175 wherein after the strapping material (e.g, loop 156) has been manually or automatically pulled through the side wall aperture by the operator it is suspended on a rib 176 at the proper predetermined length for cutting. The rib 176 may be connected to a rack or frame that is affixed to the side of the baling press or may itself be affixed to the baling press side wall.

Functions of the bale strapping insertion assembly 153 include, but are not limited to reducing the work effort required to manually, or with power, insert plastic or metal strapping material through the baling chamber via, in some embodiments, slots 114a-c on the face of the ram platen 111; reducing manual activities thus enabling operators to perform other essential activities, such as preparing and fixing (applying) straps; consistently extending and placing the straps to exactly the same distance and location; in some embodiments, allowing the strapping inserter elements to first insert and then be retracted a short and equal distance (few inches), which, with use of the strapping retention members, creates open loops at the ends of the inserted strapping material (aids the operator in manually extending/pulling the strapping material to the correct length for cutting & thereby reducing wasted strapping material, and decreases the time required to prepare the individual bale straps; eliminating twisting of strapping material as it is pressed/inserted through the platen slots (twisting complicates the decision as to the correct location to cut the strapping material and twisting can allow one end of a strap to be secured to the incorrect bale); and/or establishing loops at the end of the inserted strapping material at a consistent location, which will greatly aid the development of automatic or semi-automatic extending/pulling and cutting of the strapping material to form the actual bale straps (straps used to secure/retain the compressed bale density).

In practice, in some embodiments, when it is time to insert the strapping via the strapping insertion assembly, the compression ram stroke first will be extended by a pre-determined amount to push the bale forward a small distance. The compression ram may then be reversed a short distance creating a gap or cavity between the ram platen and the bale. At this point, the strapping insertion assembly may insert the inserter rods carrying the strapping material through the slots in the ram platen and both side walls of the extrusion chamber. It should be recognized that the compression ram positions (tie and fully extended) are adjustable. For example, in some embodiments, the maximum possible distance that the ram may extend beyond the leading edge of the charge chamber is about 24". However, the ram may be set such that it will only extend inside the extrusion chamber 18" from the leading edge of the charge chamber in a normal stroke. The ram may then be reversed approximately 4" (14" from the leading edge of the charging chamber) to create the cavity. This position may be referred to as the "tie position." The various ram positions in this process largely depends on the material being baled and the amount of memory it has. One advantage to this system is that the degree of compression ram penetration into the extrusion chamber may be minimized.

It was discovered unexpectedly that connecting and tightening of the strapping material early in the bale formation process (as is conventional) may not be suitable for biomass feedstock (e.g. cotton gin trash) since the material had very little physical memory, and thus would not expand or rebound to the spatial limits imposed by the straps. It was discovered that delaying the final connecting and tightening of the straps until the cotton gin trash or other biomass material had travelled nearer the end of the extrusion chamber or to the general location where the extrusion is at the maximum density resulted in a more effective strapping or binding process. The conventional practice had been to connect the binding material while the bale or extruded material remains in contact with the ram platen or at the location where the straps are first inserted. In some embodiments, on final charge of material for each bale, the inserter shafts insert additional strapping such that strapping is positioned on the back side of the prior bale and the front side of the next bale being formed for eventual attachment.

As mentioned previously, in some embodiments, the strapping material is stored, dispensed, and inserted from a single side of the baling press unit. A loop of strapping material is formed on the opposite side of the baling press, the strapping material may then be extended to proper length, and then the strapping material may be cut into two sections to connect strap ends on bales further down the extrusion chamber nearer the bale exit end. For example, the end of the cut strap nearest the bale exit end provides strapping the proper length to connect to the rear (last section of bale formed) of the leading bale, and the end of the strap cut nearest the compression ram (or rear of the baling press) provides the strap the proper length to connect to the front (leading edge of next bale to be formed within the extrusion chamber), or the trailing bale. Said procedure allows connecting the straps to secure bale density of a single bale even though strap was inserted on two occasions for each bale, once for leading end of bale and once for trailing end of bale. The advantages of this method include securing strapping 360-degrees around the entire bale perimeter (circumference), permitting strapping dispensing and insertion from only one side of the baling press, presenting only one location of overlapping straps to be connected, and allowing the baling press operator to work on only one side of the baling press.

The invention now will be illustrated by the following examples which, while describing procedures and mechanics associated with the baling press within the "broad ambit of this invention", are not to be construed as limiting. Appropriate changes may be made in the manner normally employed by those possessing the usual skill of this art.

Example 1

The following is a non-limiting description of tests involving an early model or prototype of a horizontal baling press. The tests were performed using mote trash feedstock. Dimensions, targets, procedures and mechanical references may have been modified since the test was performed, but broad, general principles discussed below are applicable.
Pre-bale feedstock sample density=10.96 lbs/ft$^3$
Box of feedstock was 27 lbs (loaded level) minus 2 lbs for box=25 lbs of gin trash
Box size 22"×13"×15"=4290 square inches/1728=2.48 lbs/ft$^3$
Baling charging chamber for Extrusion Baler 10 ft$^3$
Target maximum bale weight=600 lbs.
Target minimum bale weight=500 lbs.
Target bale length=60 inches or 20 ft$^3$ (24"×24"×60"=34,560 divided by 1728=20.0 ft$^3$)
Pre-Experimental Predictions Prior to the experiment it was predicted that the experiment would generate a bale 20 ft$^3$ bale that weighed 550-600 lbs had a density of 27-30 lbs/ft$^3$.
Procedure Prior to feedstock loading, the charge chamber was prepacked with feedstock to determine how to "choke down" the chamber. The tension bolts on the first tension element were opened about 0.5" on both sides of the extrusion chamber chute to release the compacted feedstock within the extrusion chamber chute. Once the chamber was free of the dense feedstock, additional feedstock was loaded into the baler.

The first four bales produced had the following measurements:

| | | | |
|---|---|---|---|
| Bale 1 = 510 lbs | 24" × 24" × 53" | 17.66 ft$^3$ | 28.87 lbs/ft$^3$ |
| Bale 2 = 542 lbs | 24" × 24" × 60" | 20.00 ft$^3$ | 27.10 lbs/ft$^3$ |
| Bale 3 = 573 lbs | 24" × 24" × 68" | 22.66 ft$^3$ | 25.28 lbs/ft$^3$ |
| Bale 4 = 518 lbs | 24" × 24" × 56" | 18.66 ft$^3$ | 27.75 lbs/ft$^3$ |

It was observed that the compression pressure decreased from 1300 PSI to 900 PSI, which led to reduced density. The bolts in the first tension element were tightened and the feedstock extruded without strapping. Compression pressure slowly increased to about 1200 PSI. Since the density was increasing with the compression pressure, a final bale number 5 was produced with straps. Bale No. 5 required 1500 PSI to extrude and weighed 611 lbs. The pallet weighed 36 lbs and the density was 29.74 lbs/ft$^3$. Converted to the target bale length of 60", the bale weight would have been 595 lbs.

| | | | |
|---|---|---|---|
| Bale 5 = 575 lbs | 24" × 24" × 58" | 19.33 ft$^3$ | 29.74 lbs/ft$^3$ |

The bale density continued to increase after the tension bolts on the first tension member were tightened with each ram cycle. In other words, bale density was holding and gaining. There remained additional adjustment capacity to narrow the extrusion chamber via tightening the tension element bolts even more which, it is suspected, would have increased density and weight even more. All five bales that were strapped weighed over 500 lbs and were within 10-20% of the target maximum weight.

It was further noted that a bale with straps in place early in the procedure offered more chamber resistance than loose material not strapped.

It was also observed that due to the amount of material packed into the three slots in the ram platen, the inserter rod had to be forced through the slots to clear the material prior to inserting a strap. It was observed that slightly reversing the ram face to insert the straps helped that process.

During testing ⅝" 0.04 PET straps were used to secure with a hand-held tensioning and welding device. The PET straps have a break-strength of 1500 lbs. In this experiment, the straps or wires were inserted through the ram face slots once the target weight has been compressed to form a bale, but tensioning the straps was delayed until the unsecured bale had moved toward the end of the extrusion chamber.

It was observed during this experiment that the baler ram will cycle in about 12-seconds (a 36" stroke) using a 40 HP power unit. Approximately 100 lbs of gin trash was compressed into the baling chamber each ram cycle if the infeed box is full. Therefore, it was estimated that no more than 7 ram cycles should be required to form a bale (plus or minus). Allowing 3 seconds of time delays and an extra 15 seconds for insurance, 2 minutes was calculated as the maximum time required to form a complete bale if gin trash is consistently loaded into the feed chute. Then allowing up to 3 minutes to insert straps, a bale should be strapped each 5 minutes or a minimum of 12 bales per hour might be possible. With modifications to the system, the rate may be increased to 15 to 16 BPH or more.

Example 2

Below is a non-limiting example of an early operation protocol. Procedures may have been modified since the test was performed but broad, general principles discussed below are applicable. When the operator's control is set to run in manual mode the ram can be run forward and reversed bypassing all switches. When the press is in automatic mode, once the photo eyes are blocked, the ram will leave the Home Switch (LS1) stroke forward to the Reverse Switch (LS3) the number of strokes indicated in the thumb wheel. Once the strokes are complete the ram will stop on the Reverse Switch (LS3), the light and buzzer will alert the operator that the bale is ready to tie. The operator will switch the baler to TIE position; the ram will stroke forward to the Full Forward Switch (LS5), and then reverse to the Tie Switch (LS4). Once the bale straps are in place the operator will switch the baler back to AUTO then press the Start Button. The ram will then return to the Home Switch (LS1) and the cycle will repeat.

When the Pressure Switch (PS1) is made the alarm will sound 1 second. The Amber Light on the panel will flash for 1 minute then turn off. Each time the preset pressure is reached the timer will reset itself and the Amber light will flash for 1 minute.

It should be noted that in the above operations protocol example, the baling press used a conventional thumb wheel to select the proper number of ram cycles. It was later determined that the thumb wheel with manual settings required persistent adjustment of the extrusion chamber tension to recover for low density or avoid too high a density (jams). The development of an extrusion chamber with two "different purposed" tension elements (e.g. first tension element and second tension element) combined with heavier construction materials ameliorated the need for major adjustment/corrections during runs.

While the present invention has been described herein with respect to the exemplary embodiments, it will become apparent to one of ordinary skill in the art that many modifications, improvements and sub-combinations of the various embodiments, adaptations and variations can be made to the invention without departing from the spirit and scope thereof.

What is claimed is:

1. A method of forming a bale of biomass feedstock or cotton gin trash having a predetermined minimum density comprising the steps of:
   providing a baling press comprising an extrusion chamber assembly wherein said extrusion chamber assembly comprises an extrusion chamber chute further comprising a first side exterior wall and a second side exterior wall, a bale exit end, a feed stock entry end, and a first tension element comprising side brackets including a first side bracket and a second side bracket, the first side bracket including a first side bracket interior wall and the second side bracket including a second side bracket interior wall, the first side bracket interior wall being adjacent and substantially co-planar with the first side exterior wall of the extrusion chamber, and the second side bracket interior wall being adjacent to and substantially co-planar with the second side exterior wall of the extrusion chamber; and
   adjusting a first gap between the first side exterior wall of the extrusion chamber chute and the first side bracket interior wall, and adjusting a second gap between the second side exterior wall of the extrusion chamber and the second side bracket interior wall, depending on a target minimum bale density;
   wherein the first tension element is positioned at a mid-section of the extrusion chamber chute.

2. The method of claim 1 wherein the adjusting is manual.

3. The method of claim 1 wherein the adjusting is automatic.

4. The method of claim 1 further comprising a second tension element.

5. The method of claim 4 wherein the second tension element is positioned proximate the bale exit end.

6. A method of forming a bale of biomass feedstock or cotton gin trash having a predetermined minimum density comprising the steps of:
   providing a baling press comprising an extrusion chamber assembly wherein said extrusion chamber assembly comprises an extrusion chamber chute further comprising a first side exterior wall and a second side exterior wall, a bale exit end, a feed stock entry end, and a first tension element comprising side brackets including a first side bracket and a second side bracket, the first side bracket including a first side bracket interior wall and the second side bracket including a second side bracket interior wall, the first side bracket interior wall being adjacent and substantially co-planar with the first side exterior wall of the extrusion chamber, and the second side bracket interior wall being adjacent to and substantially co-planar with the second side exterior wall of the extrusion chamber; and
   adjusting a first gap between the first side exterior wall of the extrusion chamber chute and the first side bracket interior wall, and adjusting a second gap between the second side exterior wall of the extrusion chamber and the second side bracket interior wall, depending on a target minimum bale density;
   wherein the first tension element is positioned near a mid-section of the extrusion chamber chute.

7. The method of claim 6 wherein the adjusting is manual.

8. The method of claim 6 wherein the adjusting is automatic.

9. The method of claim 6 further comprising a second tension element.

10. The method of claim 9 wherein the second tension element is positioned proximate the bale exit end.

* * * * *